United States Patent
Li

(10) Patent No.: US 12,053,768 B2
(45) Date of Patent: Aug. 6, 2024

(54) ADVANCED NO$_x$ REDUCTION CATALYSTS

(71) Applicant: BASF CORPORATION, Florham Park, NJ (US)

(72) Inventor: Yuejin Li, Edison, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 17/270,125

(22) PCT Filed: Jul. 30, 2019

(86) PCT No.: PCT/US2019/044014
§ 371 (c)(1),
(2) Date: Feb. 22, 2021

(87) PCT Pub. No.: WO2020/040944
PCT Pub. Date: Feb. 27, 2020

(65) Prior Publication Data
US 2021/0178380 A1    Jun. 17, 2021

Related U.S. Application Data

(60) Provisional application No. 62/721,409, filed on Aug. 22, 2018.

(51) Int. Cl.
| | | |
|---|---|---|
| B01J 37/02 | (2006.01) | |
| B01J 21/12 | (2006.01) | |
| B01J 23/42 | (2006.01) | |
| B01J 29/76 | (2006.01) | |
| B01J 35/00 | (2006.01) | |
| B01J 35/56 | (2024.01) | |
| F01N 3/08 | (2006.01) | |
| F01N 3/20 | (2006.01) | |
| F01N 3/28 | (2006.01) | |

(52) U.S. Cl.
CPC ........... *B01J 37/0244* (2013.01); *B01J 21/12* (2013.01); *B01J 23/42* (2013.01); *B01J 29/763* (2013.01); *B01J 35/19* (2024.01); *B01J 35/56* (2024.01); *F01N 3/0842* (2013.01); *F01N 3/2066* (2013.01); *F01N 3/2803* (2013.01); *F01N 2510/0682* (2013.01); *F01N 2510/0684* (2013.01)

(58) Field of Classification Search
None
See application file for complete search history.

(56) References Cited

U.S. PATENT DOCUMENTS

| | | | |
|---|---|---|---|
| 3,030,181 A | 4/1962 | Milton | |
| 4,440,871 A | 4/1984 | Lok et al. | |
| 4,544,538 A | 10/1985 | Zones | |
| 6,162,415 A | 12/2000 | Liu et al. | |
| 6,709,644 B2 | 3/2004 | Zones et al. | |
| 7,264,789 B1 | 9/2007 | Verduijn et al. | |
| 8,568,674 B1 * | 10/2013 | Sung ................ | B01D 53/9477 60/299 |
| 2008/0292519 A1 | 11/2008 | Caudle et al. | |
| 2009/0126353 A1 * | 5/2009 | Han .................. | B01J 23/8926 422/177 |
| 2012/0214663 A1 | 8/2012 | Chigapov et al. | |
| 2014/0154144 A1 * | 6/2014 | Aoki ................. | B01J 35/10 422/180 |
| 2014/0230418 A1 * | 8/2014 | Perrot .............. | F01N 13/02 60/324 |
| 2015/0037233 A1 * | 2/2015 | Fedeyko .......... | B01J 23/6482 422/171 |
| 2015/0174564 A1 | 6/2015 | Muller-Stach et al. | |
| 2015/0273452 A1 | 10/2015 | Chiffey et al. | |
| 2015/0352492 A1 * | 12/2015 | Andersen ......... | B01J 35/0006 502/65 |
| 2016/0222852 A1 | 8/2016 | Ren et al. | |
| 2016/0367941 A1 * | 12/2016 | Gilbert ............. | B01D 53/9472 |
| 2017/0087541 A1 * | 3/2017 | Andersen ......... | B01J 35/0006 |
| 2018/0043335 A1 | 2/2018 | Grubert et al. | |

(Continued)

FOREIGN PATENT DOCUMENTS

| | | |
|---|---|---|
| CA | 2791997 | * 11/2009 |
| CN | 1320475 | * 11/2001 |
| CN | 102815700 | * 12/2012 |

(Continued)

OTHER PUBLICATIONS

European Search Report for EP Patent Application No. 19851868.0, Issued on Apr. 21, 2022, 3 pages.
International Search Report dated Nov. 13, 2019.
Written Opinion dated Nov. 13, 2019.
Barrer, et al., "562. The hydrothermal chemistry of the silicates. Part VII. Synthetic potassium aluminosilicates", Journal of the Chemical Society (Resumed), 1956, pp. 2882-2891.
Bleken, et al., "The Effect of Acid Strength on the Conversion of Methanol to Olefins Over Acidic Microporous Catalysts with the CHA Topology", Topics in Catalysis, vol. 52, Issue 3, Jan. 7, 2009, pp. 218-228.

(Continued)

*Primary Examiner* — Sheng H Davis
(74) *Attorney, Agent, or Firm* — DLA Piper LLP (US)

(57) ABSTRACT

A selective catalytic reduction (SCR) catalyst composition effective in the abatement of nitrogen oxides (NO$_x$) is provided. The SCR catalyst composition significantly increases the conversion of NO$_x$ relative to a Cu-chabazite reference catalyst composition at any temperature, and especially at low temperatures. A catalyst article, an exhaust gas treatment system, and a method of treating an exhaust gas stream, each including the SCR catalyst composition of the invention, are also provided. The SCR catalyst composition is particularly useful for treatment of exhaust from a lean-burn engine.

22 Claims, 15 Drawing Sheets

(56) References Cited

U.S. PATENT DOCUMENTS

2018/0056278 A1* 3/2018 Feaviour ............... B01J 29/06
2018/0078926 A1* 3/2018 Chen ................ B01D 53/9418

FOREIGN PATENT DOCUMENTS

| GB | 868846 A | | 5/1961 |
|----|----------|---|--------|
| KR | 101688668 | * | 12/2016 |
| KR | 101865744 | * | 6/2018 |
| WO | 2010062730 | * | 6/2010 |
| WO | 2016/070090 A1 | | 5/2016 |
| WO | 2017/037006 A1 | | 3/2017 |
| WO | 2017037006 | * | 3/2017 |
| WO | 2018163052 | * | 9/2018 |
| WO | 2020/234375 A1 | | 11/2020 |

OTHER PUBLICATIONS

Heck, et al., "Chapter 2—The Preparation of Catalytic Materials: Carriers, Active Components, and Monolithic Substrates", Catalytic Air Pollution Control: Commercial Technology, 2nd Edition, 2002, pp. 18-19.

* cited by examiner

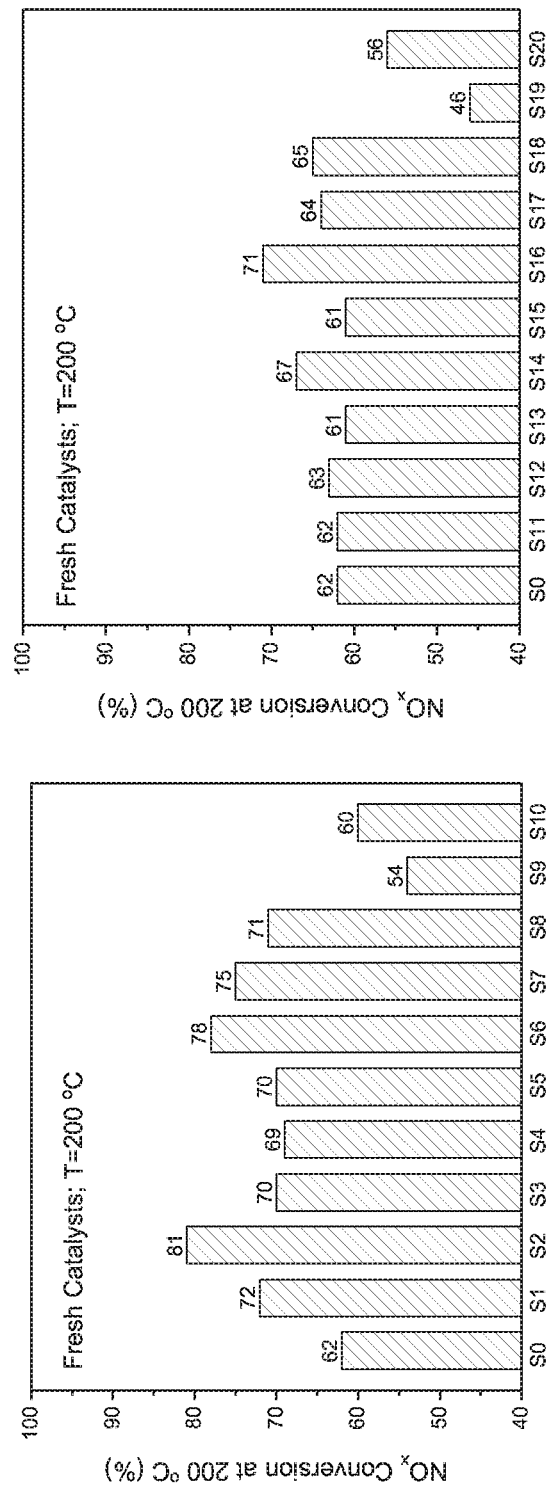

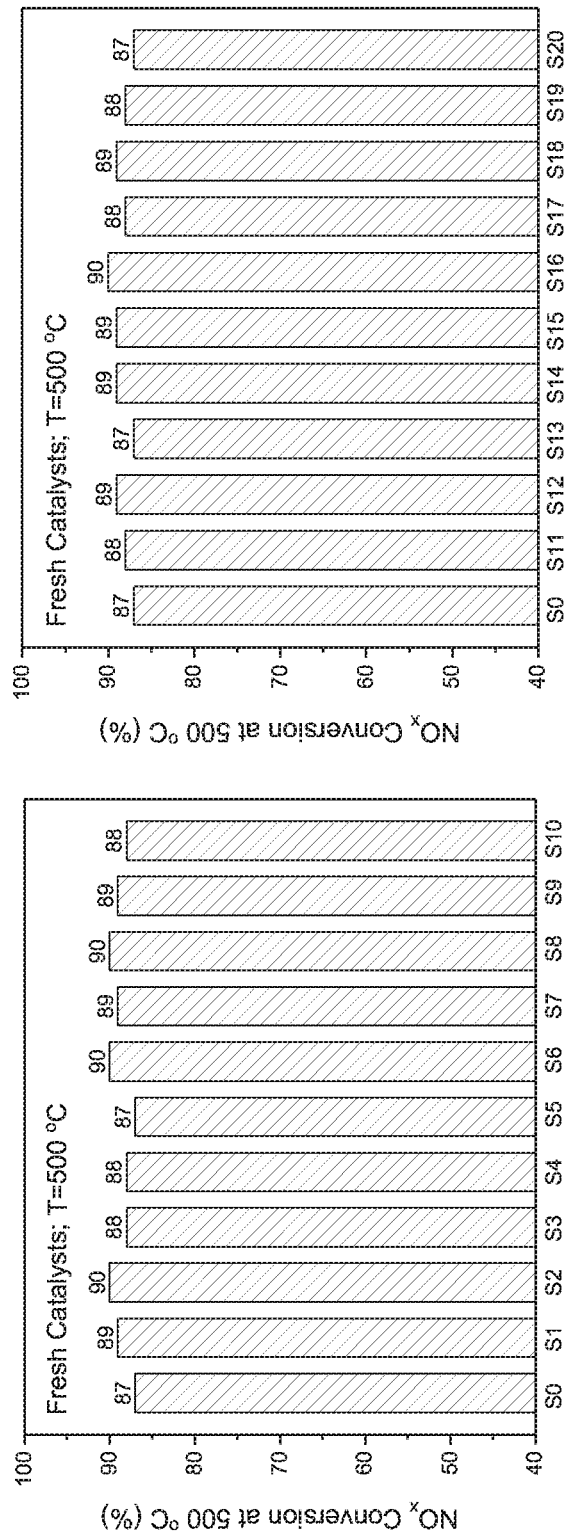

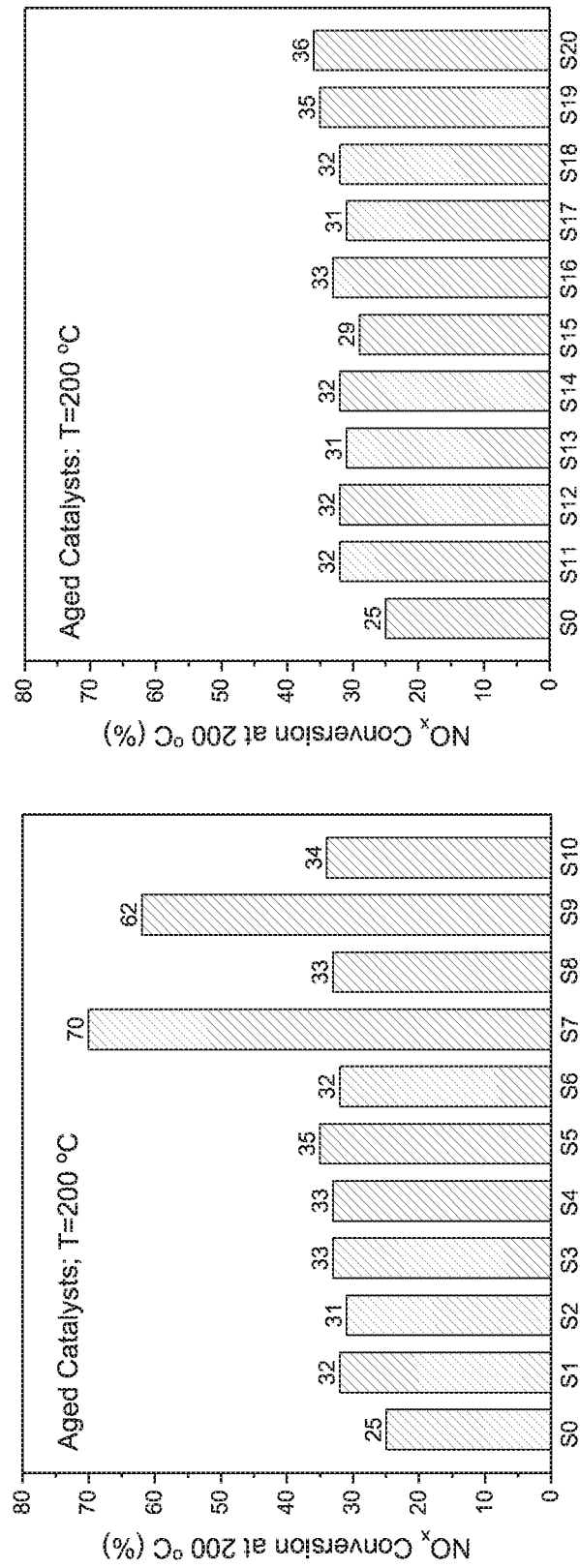

ADVANCED NO$_x$ REDUCTION CATALYSTS

CROSS-REFERENCE TO RELATED APPLICATIONS

This application is a national stage of PCT/US2019/044014, filed Jul. 30, 2019 which claims the benefit of U.S. Provisional Application No. 62/721,409 filed Aug. 22, 2018, the contents of which are hereby incorporated by reference in their entirety.

TECHNICAL FIELD OF THE INVENTION

The present invention relates generally to the field of exhaust gas treatment catalysts, particularly catalyst compositions capable of reducing NO$_x$ in engine exhaust, catalyst articles coated with such compositions, emission treatment systems comprising such catalyst articles, and methods of use thereof.

BACKGROUND OF THE INVENTION

Environmental regulations for emissions of internal combustion engines are becoming increasingly stringent throughout the world.

Exhaust gas from vehicles powered by lean burn diesel engines emit exhaust gas emissions containing unburned hydrocarbons (HC), carbon monoxide (CO), and nitrogen oxides (NO$_x$), where NO$_x$ describes various chemical species of nitrogen oxides, including nitrogen monoxide and nitrogen dioxide, among others. "Lean" refers to maintaining the ratio of air to fuel in the combustion mixtures supplied to such engines above the stoichiometric ratio so that the resulting exhaust gases are "lean," i.e., the exhaust gases are relatively high in oxygen content. An air-to-fuel (A/F) ratio is the mass ratio of air to fuel present in a combustion process such as in an internal combustion engine. Operations of lean burn diesel engines provide the user with excellent fuel economy due to their operation at high air/fuel ratios under fuel lean conditions. The precise proportion of air to fuel which results in stoichiometric conditions varies with the relative proportions of carbon and hydrogen in the fuel. The stoichiometric A/F ratio corresponds to the complete combustion of a hydrocarbon fuel to carbon dioxide (CO$_2$) and water.

Oxidation catalysts comprising a precious metal, such as platinum group metals (PGM), dispersed on a refractory metal oxide support, such as alumina, are known for use in treating the exhaust of diesel engines in order to convert both HC and CO gaseous pollutants by catalyzing the oxidation of these pollutants to carbon dioxide and water. Such catalysts have been generally contained in units called diesel oxidation catalysts (DOC), which are placed in the exhaust flow path from diesel power systems to treat the exhaust before it vents to the atmosphere. Typically, the diesel oxidation catalysts are formed on ceramic or metallic substrates upon which one or more catalyst coating compositions are deposited. In addition to the conversion of gaseous HC and CO emissions, oxidation catalysts that contain PGM promote the oxidation of NO to NO$_2$.

NO$_x$ components, including NO$_2$ formed by a DOC, must then be removed from the exhaust stream, typically by reducing NO$_x$ components with a suitable reductant in the presence of a selective catalytic reduction (SCR) catalyst. The SCR process uses catalytic reduction of nitrogen oxides with a reductant (e.g., ammonia) in the presence of atmospheric oxygen, resulting in the formation predominantly of nitrogen and steam:

  (standard SCR reaction)

  (slow SCR reaction)

  (fast SCR reaction)

Current catalysts employed in the SCR process include molecular sieves, such as zeolites, ion-exchanged with a catalytic metal such as iron or copper. A useful SCR catalyst composition is able to effectively catalyze the reduction of the NO$_x$ exhaust component at temperatures above 200° C. and below 600° C., so that reduced NO$_x$ levels can be achieved even under conditions of low load which typically are associated with lower exhaust temperatures.

Conventional gasoline engines having electronic fuel injection and air intake systems provide a constantly varying air-fuel mixture that quickly and continually cycles between lean and rich exhaust. Recently, to improve fuel-economy, gasoline-fueled engines are being designed to operate under lean conditions. The fuel efficiency benefits that lean burn gasoline direct injection (GDI) engines offer can contribute to a reduction in greenhouse gas emissions by carrying out fuel combustion in excess air.

Exhaust gas from vehicles powered by lean burn gasoline engines is typically treated with a Three-way catalyst (TWC), which is effective to abate CO and HC pollutants in the exhaust of engines operated under lean conditions. Emission of NO$_x$ also must be reduced to meet emission regulation standards; TWC catalysts, however, are not effective for reducing NO$_x$ emissions when the gasoline engine runs lean. The use of certain SCR catalysts for lean burn gasoline engines presents a challenge as such catalysts are expected to exhibit thermal stability at high temperature under transient lean/rich conditions.

There is a continuing need in the art for SCR catalysts effective to abate NO$_x$ emissions from exhaust gas streams efficiently and effectively. Increasingly stringent emissions regulations have driven the need for developing SCR catalysts with improved capacity to manage NOx emissions, particularly under lean, low engine exhaust temperature conditions, while also exhibiting sufficient high temperature thermal stability.

SUMMARY OF THE INVENTION

The present disclosure provides advanced selective catalytic reduction (SCR) catalyst compositions and articles comprising the SCR catalyst compositions, which significantly increase NO$_x$ conversion relative to standard Cu-chabazite reference SCR catalyst compositions. The present SCR catalyst compositions improve NO$_x$ conversion at any temperature, and especially at low temperatures. Further provided are methods of preparation of the disclosed SCR catalyst compositions as well as catalytic articles, exhaust treatment systems, and methods of treating exhaust streams, each comprising the disclosed SCR catalyst compositions.

Accordingly, in one aspect is provided a selective catalytic reduction (SCR) catalyst composition effective to catalyze the reduction of nitrogen oxides (NO$_x$) from a lean burn engine exhaust gas in the presence of a reductant, the catalyst composition comprising a first component comprising a porous refractory metal oxide support having deposited thereon a platinum group metal (PGM) and a base metal oxide; and a second component comprising a zeolite promoted with a metal, wherein the weight ratio of the first component to the second component is in a range from about 0.05 to about 0.5.

In some embodiments, the porous refractory metal oxide comprises silica, alumina, ceria, zirconia, ceria-zirconia composite, titania, or combinations thereof. In some embodiments, the porous refractory metal oxide comprises silica in an amount of from about 1% to about 20% by weight and alumina in an amount of from about 80% to about 99% by weight. In some embodiments, the porous refractory metal oxide comprises silica in an amount of from about 5% by weight and alumina in an amount of from about 95% by weight.

In some embodiments, the PGM is selected from platinum, palladium, rhodium, and combinations thereof.

In some embodiments, the base metal oxide is an oxide of Ti, V, Cr, Mn, Fe, Co, Ni, Cu, Zn, Mo, Mo, Ag, Sn, or a combination thereof. In some embodiments, the base metal oxide is CuO.

In some embodiments, the zeolite has a structure type selected from the group consisting of AEI, AFT, AFV, AFX, AVL, CHA, DDR, EAB, EEI, ERI, IFY, IRN, KFI, LEV, LTA, LTN, MER, MWF, NPT, PAU, RHO, RTE, RTH, SAS, SAT, SAV, SFW, TSC, UFI, and combinations thereof. In some embodiments, the zeolite has a structure type selected from the group consisting of CHA and AEI.

In some embodiments, the metal is one or more of Cu, Co, Ni, La, Mn, Fe, V, Ag, Ce, Nd, Mo, Hf, Y, or W. In some embodiments, the metal is one or more of Cu, Fe, or Ce.

In some embodiments, the base metal oxide is present in an amount of from about 0.1 to about 20% by weight of the porous refractory metal oxide support.

In some embodiments, the PGM is present in an amount of from about 0.01 to about 20% by weight of the porous refractory metal oxide support.

In another aspect is provided an SCR article effective to catalyze the reduction of $NO_x$ from a lean burn engine exhaust gas in the presence of a reductant, the SCR article comprising a substrate having an inlet end and an outlet end defining an overall length, and the SCR catalyst composition as disclosed herein disposed thereon.

In some embodiments, the SCR catalyst composition comprises a first washcoat comprising a mixture of (a) the first component; and (b) the second component, wherein the first washcoat is disposed on at least a portion of the length of the catalyst substrate; and a second washcoat comprising the second component, wherein the second washcoat is disposed on at least a portion of the length of the catalyst substrate.

In some embodiments, the first washcoat is disposed directly on the catalyst substrate, and the second washcoat is disposed on at least a portion of the first washcoat. In some embodiments, the second washcoat is disposed directly on the catalyst substrate, and the first washcoat is disposed on at least a portion of the second washcoat. In some embodiments, the first washcoat is disposed directly on the catalyst substrate from the inlet end to a length of from about 10% to about 50% of the overall length; and the second washcoat is disposed on at least a portion of the first washcoat. In some embodiments, the first washcoat is disposed directly on the catalyst substrate from the inlet end to a length of about 10%, about 20%, about 30%, about 40%, or about 50% of the overall length; and the second washcoat is disposed on at least a portion of the first washcoat.

In some embodiments, the second washcoat is disposed directly on the catalyst substrate from the inlet end to a length of from about 50% to about 100% of the overall length; and the first washcoat is disposed on at least a portion of the second washcoat. In some embodiments, the second washcoat is disposed directly on the catalyst substrate from the inlet end to a length of about 50%, about 60%, about 70%, about 80%, about 90%, or about 100% of the overall length; and the first washcoat is disposed on at least a portion of the second washcoat.

In some embodiments, the first washcoat is disposed directly on the catalyst substrate from the inlet end to a length of from about 20% to about 40% of the overall length, and the second washcoat extends from the inlet end to the outlet end. In some embodiments, the first washcoat is disposed directly on the catalyst substrate from the inlet end to a length of about 20, about 25%, about 30%, about 35%, or about 40% of the overall length, and the second washcoat extends from the inlet end to the outlet end. In some embodiments, the first washcoat is disposed directly on the catalyst substrate from the inlet end to a length of about 33% of the overall length, and the second washcoat extends from the inlet end to the outlet end.

In some embodiments, the first washcoat is disposed directly on the catalyst substrate from the outlet end to a length of from about 10% to about 50% of the overall length, and the second washcoat is disposed on at least a portion of the first washcoat. In some embodiments, the first washcoat is disposed directly on the catalyst substrate from the outlet end to a length of about 10%, about 20%, about 30%, about 40%, or about 50% of the overall length, and the second washcoat is disposed on at least a portion of the first washcoat.

In some embodiments, the first washcoat is disposed directly on the catalyst substrate from the outlet end to a length from about 20 to about 40% of the overall length, and the second washcoat extends from the inlet end to the outlet end. In some embodiments, the first washcoat is disposed directly on the catalyst substrate from the outlet end to a length of about 20, about 25%, about 30%, about 35%, or about 40% of the overall length, and the second washcoat extends from the inlet end to the outlet end. In some embodiments, the first washcoat is disposed directly on the catalyst substrate from the outlet end to a length of about 33% of the overall length, and the second washcoat extends from the inlet end to the outlet end.

In some embodiments, the second washcoat is disposed directly on the catalyst substrate from the outlet end to a length of from about 50% to about 100% of the overall length, and the first washcoat is disposed on at least a portion of the second washcoat.

In some embodiments, the first washcoat is disposed directly on the catalyst substrate covering 100% of the overall length, and the second washcoat is disposed on the first washcoat covering 100% of the overall length. In some embodiments, the second washcoat is disposed directly on the catalyst substrate covering 100% of the overall length, and the first washcoat is disposed on the second washcoat covering 100% of the overall length.

In some embodiments, the SCR article has a zoned configuration wherein the first washcoat is disposed on the catalyst substrate from the inlet end to a length of from about 10% to about 50% of the overall length; and wherein the second washcoat is disposed on the catalyst substrate from the outlet end to a length of from about 50% to about 90% of the overall length. In some embodiments, the SCR article has a zoned configuration, wherein the first washcoat is disposed on the catalyst substrate from the outlet end to a length of from about 10% to about 50% of the overall length; and wherein the second washcoat is disposed on the catalyst substrate from the inlet end to a length of from about 50% to about 90% of the overall length.

In some embodiments, the first washcoat has a porous refractory metal oxide-to-zeolite weight ratio of from about 0.1 to about 10. In some embodiments, the first washcoat has a porous refractory metal oxide-to-zeolite weight ratio of from about 0.2 to about 5. In some embodiments, the first washcoat has a porous refractory metal oxide-to-zeolite weight ratio of about 0.2, about 0.25, about 0.3, about 0.4, about 0.5, about 0.6, about 0.7, about 0.8, about 0.9, about 1, about 2, about 3, about 4, or about 5.

In some embodiments, the PGM component is Pt, the base metal oxide is copper oxide, the zeolite has the chabazite structure and is promoted with copper, the porous refractory metal oxide is alumina containing 5% silica, the Pt is present in an amount of about 2.9% by weight of the porous refractory metal oxide, and the copper oxide is present in an amount of about 10% by weight of the porous refractory metal oxide.

In some embodiments, the substrate is a honeycomb substrate. In some embodiments, the honeycomb substrate is metal, ceramic, silicon carbide, cordierite, or aluminum titanate. In some embodiments, the honeycomb substrate is metal or ceramic. In some embodiments, the honeycomb substrate is a flow-through substrate or a wall-flow filter (also referred to as SCR on filter, SCRoF).

In some embodiments, the effective reduction of $NO_x$ is at a temperature that is above about 150° C. and below about 700° C. In some embodiments, the effective reduction of $NO_x$ is at a temperature of from about 200° C. to about 600° C. In some embodiments, the conversion of $NO_x$ is increased by at least 10% at 200° C. relative to a reference catalytic article having only a copper-chabazite washcoat disposed on the substrate. In some embodiments, the conversion of $NO_x$ is increased by at least 40% at 200° C. relative to a reference catalytic article having only a copper-chabazite washcoat disposed on the substrate.

In a further aspect is provide an exhaust gas treatment system comprising a lean burn engine that produces an exhaust gas stream and the SCR article as disclosed herein. In some embodiments, the exhaust gas treatment system further comprises one or more of a diesel oxidation catalyst (DOC), a soot filter, a urea injection component, an ammonia oxidation catalyst (AMOX), a low-temperature NOx absorber (LT-NA) catalyst, and a lean NOx trap (LNT).

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, in which reference numerals refer to components of exemplary embodiments of the invention. The drawings are exemplary only, and should not be construed as limiting the invention. The disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

FIGS. 7a and 7b are graphical depictions of results of $NO_x$ conversion at 200° C. for fresh SCR catalyst articles according to certain embodiments.

FIGS. 8a and 8b are graphical depictions of results of $NO_x$ conversion at 500° C. for fresh SCR catalyst articles according to certain embodiments.

FIGS. 10a and 10b are graphical depictions of results of $NO_x$ conversion at 200° C. for aged SCR catalyst articles according to certain embodiments.

DETAILED DESCRIPTION OF THE INVENTION

Figure 1A:
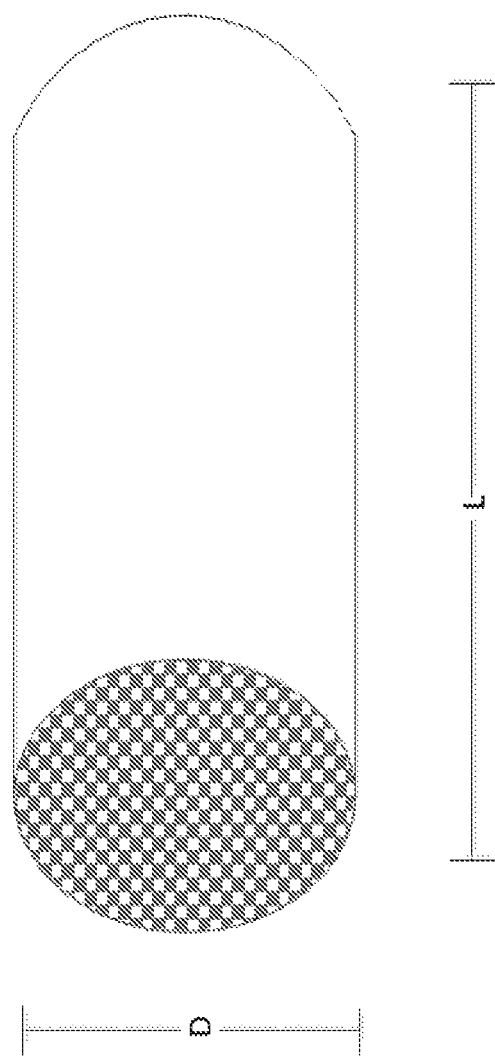
FIG. 1a is a perspective view of a wall-flow filter substrate.

The present disclosure provides advanced selective catalytic reduction (SCR) catalyst compositions and articles which significantly increase $NO_x$ conversion relative to standard Cu-chabazite reference SCR catalyst composition and articles. The present SCR catalyst compositions and articles improve $NO_x$ conversion at any temperature, and especially at low temperatures. Further provided are methods of preparation of the disclosed SCR catalyst compositions as well as catalytic articles, exhaust treatment systems and methods of treating exhaust streams, each comprising the disclosed SCR catalyst compositions.

Before describing several exemplary embodiments of the invention, it is to be understood that the invention is not limited to the details of construction or process steps set forth in the following description. The invention is capable of other embodiments and of being practiced or being carried out in various ways.

Definitions

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by ±5%, ±4%, ±3%, ±2%, ±1%, ±0.5%, ±0.4%, ±0.3%, ±0.2%, ±0.1% or ±0.05%. All numeric values are modified by the term "about" whether or not explicitly indicated. Numeric values modified by the term "about" include the specific identified value. For example "about 5.0" includes 5.0. Recitation of ranges of values herein are merely intended to serve as a shorthand method of referring individually to each separate value falling within the range, unless otherwise indicated herein, and each separate value is incorporated into the specification as if it were individually recited herein.

The term "catalyst" refers to a material that promotes a chemical reaction. The catalyst includes the "catalytically active species" and the "support" that carries or supports the active species. For example, zeolite particles may be a support for base metal catalytic species.

The catalytically active species are also termed "promoters" as they promote chemical reactions.

As used herein, the term "promoted" refers to a component that is intentionally added to, e.g., a molecular sieve material, typically through ion exchange, as opposed to impurities inherent in the molecular sieve. A molecular sieve may, for example, be promoted with copper (Cu) and/or iron (Fe), although other catalytic metals could be used, such as manganese, cobalt, nickel, cerium, platinum, palladium, rhodium or combinations thereof.

As used herein, "impregnated" or "impregnation" refers to permeation of the catalytic material into the porous structure of the support material.

As used herein, the term "support" or "support material" refers to any high surface area material, usually a metal oxide material, upon which a catalytic precious metal is applied. The term "on a support" means "dispersed on", "incorporated into", "impregnated into", "on", "in", "deposited on" or otherwise associated with.

The term "catalytic article" or "catalyst article" refers to a component that is used to promote a desired reaction. The present catalytic articles comprise a "substrate" having at least one catalytic coating disposed thereon.

In general, the term "effective" means for example from about 35% to 100% effective, for instance from about 40%, about 45%, about 50% or about 55% to about 60%, about 65%, about 70%, about 75%, about 80%, about 85%, about 90% or about 95%, regarding the defined catalytic activity or storage/release activity, by weight or by moles.

The term "exhaust stream" or "exhaust gas stream" refers to any combination of flowing gas that may contain solid or liquid particulate matter. The stream comprises gaseous components and is for example exhaust of a lean burn engine, which may contain certain non-gaseous components such as liquid droplets, solid particulates and the like. The exhaust gas stream of a combustion engine typically further comprises combustion products ($CO_2$ and $H_2O$), products of incomplete combustion (carbon monoxide (CO) and hydrocarbons (HC)), oxides of nitrogen ($NO_x$), combustible and/or carbonaceous particulate matter (soot), and unreacted oxygen and nitrogen.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine. The inlet end of a substrate is synonymous with the "upstream" end or "front" end. The outlet end is synonymous with the "downstream" end or "rear" end. An upstream zone is upstream of a downstream zone. An upstream zone may be closer to the engine or manifold, and a downstream zone may be further away from the engine or manifold.

The term "in fluid communication" is used to refer to articles positioned on the same exhaust line, i.e., a common exhaust stream passes through articles that are in fluid communication with each other. Articles in fluid communication may be adjacent to each other in the exhaust line. Alternatively, articles in fluid communication may be separated by one or more articles, also referred to as "washcoated monoliths."

A "platinum group metal (PGM)" refers to any PGM (Ru, Rh, Os, Ir, Pd, Pt and/or Au). Reference to "PGM" allows for the presence of the PGM in any valence state. For example, the PGM may be in metallic form, with zero valence, or the PGM may be in an oxide form. The terms "platinum (Pt) component," "rhodium (Rh) component," "palladium (Pd) component," "iridium (Ir) component," "ruthenium (Ru) component," and the like refer to the respective platinum group metal compound, complex, or the like which, upon calcination or use of the catalyst, decomposes or otherwise converts to a catalytically active form, usually the metal or the metal oxide.

As used herein, "base metal oxide" refers to an oxide compound comprising a transition metal or lanthanide (e.g., vanadium (V), tungsten (W), titanium (Ti), copper (Cu), iron (Fe), cobalt (Co), nickel (Ni), chromium (Cr), manganese (Mn), cerium (Ce), lanthanum (La), praseodymium (Pr), zinc (Zn), niobium (Nb), zirconium (Zr), molybdenum (Mo), tin (Sn), silver (Ag), gold (Au) or combinations thereof that is catalytically active for reduction of $NO_R$, or promotes another catalytic component to be more active for reduction of $NO_x$. Base metal oxides particularly include oxides of copper, silver, iron, manganese, tin, cobalt, nickel, and combinations thereof. For ease of reference herein, concentrations of base metal or base metal oxide materials are reported in terms of elemental metal concentration rather than the oxide form. The total concentration of base metal in the base metal oxide component (e.g., copper, manganese, nickel, cobalt, iron, and combinations thereof) can vary, but will typically be from about 1 wt. % to 50 wt. % relative to the weight of the porous support, such as refractory oxide support material (e.g., about 1 wt. % to about 50 wt. % relative to the refractory oxide support).

"Support" in a catalytic material or catalyst washcoat refers to a material that receives metals (e.g., PGMs), stabilizers, promoters, binders, and the like through precipitation, association, dispersion, impregnation, or other suitable methods. Exemplary supports include porous refractory metal oxide supports as described herein below.

"High surface area refractory metal oxide supports" refer specifically to support particles having pores larger than 20 Å and a wide pore distribution. High surface area refractory metal oxide supports, e.g., alumina support materials, also referred to as "gamma alumina" or "activated alumina,"

typically exhibit a BET surface area of fresh material in excess of 60 square meters per gram ("m²/g"), often up to about 200 m²/g or higher. Such activated alumina is usually a mixture of the gamma and delta phases of alumina, but may also contain substantial amounts of eta, kappa and theta alumina phases.

As used herein, the term "BET surface area" has its usual meaning of referring to the Brunauer, Emmett, Teller method for determining surface area by $N_2$ adsorption. Pore diameter and pore volume can also be determined using BET-type $N_2$ adsorption or desorption experiments.

As used herein, the term "molecular sieves," such as zeolites and other zeolitic framework materials (e.g. isomorphously substituted materials), refers to materials that may, in particulate form, support catalytic metal components. Molecular sieves are materials based on an extensive three-dimensional network of oxygen ions containing generally tetrahedral type sites and having a substantially uniform pore distribution, with the pore size being no larger than 20 Ångstroms (Å).

Molecular sieves can be zeolitic (zeolites) or may be non-zeolitic. Both zeolitic and non-zeolitic molecular sieves can have the chabazite crystal structure, which is also referred to as the CHA structure by the International Zeolite Association. Zeolitic chabazite includes a naturally occurring tectosilicate mineral of a zeolite group with approximate formula $Ca_6[Al_{12}Si_{24}O_{72}]\cdot 40H_2O$ (i.e., hydrated calcium aluminum silicate). Three synthetic forms of zeolitic chabazite are described in "Zeolite Molecular Sieves," by D. W. Breck, published in 1973 by John Wiley & Sons, which is hereby incorporated by reference. The three synthetic forms reported by Breck are Zeolite K-G, described in J. Chem. Soc., p. 2822 (1956), Barrer et. Al.; Zeolite D, described in British Patent No. 868,846 (1961); and Zeolite R, described in U.S. Pat. No. 3,030,181. Synthesis of another synthetic form of zeolitic chabazite, SSZ-13, is described in U.S. Pat. No. 4,544,538. Synthesis of a synthetic form of a non-zeolitic molecular sieve having the chabazite crystal structure, silicoaluminophosphate 34 (SAPO-34), is described in U.S. Pat. Nos. 4,440,871 and 7,264,789. A method of making yet another synthetic non-zeolitic molecular sieve having chabazite structure, SAPO-44, is described for instance in U.S. Pat. No. 6,162,415.

Molecular sieves comprise small pore, medium pore and large pore molecular sieves or combinations thereof. The pore sizes are defined by the ring size. A small pore molecular sieve contains channels defined by up to eight tetrahedral atoms. A medium pore molecular sieve contains channels defined by ten-membered rings. A large pore molecular sieve contains channels defined by twelve-membered rings. As used herein, the term "small pore" refers to pore openings which are smaller than about 5 Å (Angstroms), for example on the order of about 3.8 Å.

Exemplary small pore molecular sieves include framework types ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, ZON and mixtures or intergrowths thereof.

The phrase "8-ring" molecular sieve refers to a molecular sieve having 8-ring pore openings and double-six ring secondary building units and having a cage like structure resulting from the connection of double six-ring building units by 4 rings. A synthetic 8-ring small pore molecular sieve (for example having the CHA structure) may be prepared via mixing a source of silica, a source of alumina and a structure directing agent under alkaline aqueous conditions. Typical silica sources include various types of fumed silica, precipitated silica and colloidal silica, as well as silicon alkoxides. Typical alumina sources include boehmites, pseudo-boehmites, aluminum hydroxides, aluminum salts such as aluminum sulfite or sodium aluminate and aluminum alkoxides. Sodium hydroxide is typically added to the reaction mixture. A typical structure directing agent for this synthesis is adamantyltrimethyl ammonium hydroxide, although other amines and/or quaternary ammonium salts may be substituted or added. The reaction mixture is heated in a pressure vessel with stirring to yield a crystalline product. Typical reaction temperatures are in the range of from about 100° C. to about 200° C., for instance from about 135° C. to about 170° C. Typical reaction times are between 1 hr and 30 days and in some embodiments, from 10 hours to 3 days. At the conclusion of the reaction, the pH is optionally adjusted to between 6 and 10, for example between 7 and 7.5 and the product is filtered and washed with water. Any acid can be used for pH adjustment, for instance nitric acid. Optionally, the product may be centrifuged. Organic additives may be used to help with the handling and isolation of the solid product. Spray-drying is an optional step in the processing of the product. The solid product is thermally treated in air or nitrogen. Alternatively, each gas treatment can be applied in various sequences or mixtures of gases can be applied. Typical calcination temperatures are in from about 400° C. to about 850° C. Molecular sieves having a CHA structure may be prepared for instance according to methods disclosed in U.S. Pat. Nos. 4,544,538 and 6,709,644.

Exemplary medium pore molecular sieves include framework types AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI, WEN and mixtures or intergrowths thereof.

Exemplary large pore molecular sieves include framework types AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, VET and mixtures or intergrowths thereof.

As used herein, the term "zeolite" refers to a specific example of a molecular sieve, further including silicon and aluminum atoms. Generally, a zeolite is defined as an aluminosilicate with an open 3-dimensional framework structure composed of corner-sharing $TO_4$ tetrahedra, where T is Al or Si, or optionally P. Cations that balance the charge of the anionic framework are loosely associated with the framework oxygens, and the remaining pore volume is filled with water molecules. The non-framework cations are generally exchangeable, and the water molecules removable.

Aluminosilicate zeolite structures do not include phosphorus or other metals isomorphically substituted in the framework. That is, "aluminosilicate zeolite" excludes aluminophosphate materials such as SAPO, AlPO and MeAlPO materials, while the broader term "zeolite" includes aluminosilicates and aluminophosphates. For the purposes of this disclosure, SAPO, AlPO and MeAlPO materials are considered non-zeolitic molecular sieves.

Zeolites can be differentiated mainly according to the geometry of the voids which are formed by the rigid network of the $(SiO_4)/AlO_4$ tetrahedra. The entrances to the voids are formed from 6, 8, 10, or 12 ring atoms with respect to the atoms which form the entrance opening. Zeolites are crystalline materials having rather uniform pore sizes which, depending upon the type of zeolite and the type and amount of cations included in the zeolite lattice, range from about 3 to 10 Å in diameter.

A zeolite may comprise $SiO_4/AlO_4$ tetrahedra that are linked by common oxygen atoms to form a three-dimensional network. The molar ratio of silica-to-alumina ("SAR") of a present zeolite can vary over a wide range, but is generally 2 or greater. For instance, a present zeolite may have a SAR of from about 5 to about 1000.

As used herein, the term "substrate" refers to the monolithic material onto which the catalyst composition, that is, catalytic coating, is disposed, typically in the form of a washcoat. In one or more embodiments, the substrates are flow-through monoliths and monolithic wall-flow filters. A washcoat is formed by preparing a slurry containing a specified solids content (e.g., 30-90% by weight) of catalyst in a liquid, which is then coated onto a substrate and dried to provide a washcoat layer.

Reference to "monolithic substrate" means a unitary structure that is homogeneous and continuous from inlet to outlet.

"Washcoat" has its usual meaning in the art of a thin, adherent coating of a material (e.g., a catalyst) applied to a "substrate", such as a honeycomb flow-through monolith substrate or a filter substrate which is sufficiently porous to permit the passage therethrough of the gas stream being treated. As used herein and as described in Heck, Ronald and Farrauto, Robert, Catalytic Air Pollution Control, New York: Wiley-Interscience, 2002, pp. 18-19, a washcoat layer includes a compositionally distinct layer of material disposed on the surface of a monolithic substrate or an underlying washcoat layer. A substrate can contain one or more washcoat layers, and each washcoat layer can be different in some way (e.g., may differ in physical properties thereof such as, for example particle size or crystallite phase) and/or may differ in the chemical catalytic functions.

The terms "on" and "over" in reference to a coating layer may be used synonymously. The term "directly on" means in direct contact with. The disclosed articles are referred to in certain embodiments as comprising one coating layer "on" a second coating layer, and such language is intended to encompass embodiments with intervening layers, where direct contact between the coating layers is not required (i.e., "on" is not equated with "directly on").

The term "$NO_x$" refers to nitrogen oxide compounds, such as NO or $NO_2$.

"Selective Catalytic Reduction" (SCR) is the catalytic reduction of nitrogen oxides with a reductant in the presence of an appropriate amount of oxygen with the formation predominantly of nitrogen and water vapor (steam). Reductants may be, for example, hydrocarbon, hydrogen, and/or ammonia. SCR reactions in the presence of ammonia occur according to the following three reactions (Equations 1-3):

$$4NO+4NH_3+O_2 \rightarrow 4N_2+6H_2O \quad \text{(Equation 1)}$$

$$NO+NO_2+2NH_3 \rightarrow 2N_2+3H_2O \quad \text{(Equation 2)}$$

$$6NO_2+8NH_3 \rightarrow 7N_2+12H_2O \quad \text{(Equation 3)}$$

"TWC" refers to the function of three-way conversion where hydrocarbons, carbon monoxide, and nitrogen oxides are substantially simultaneously converted. A gasoline engine typically operates under near stoichiometric reaction conditions that oscillate or are perturbated slightly between fuel rich and fuel lean air-to-fuel ratios (A/F ratios) (•=1±~0.01). Use of "stoichiometric" herein refers to the conditions of a gasoline engine, accounting for the oscillations or perturbations of A/F ratios near stoichiometric. TWC catalysts include oxygen storage components (OSCs) such as ceria or ceria-zirconia (as referenced below) that have multivalent states which allow oxygen to be held and released under varying air-to-fuel ratios. Under rich conditions when $NO_x$ is being reduced, the OSC provides a small amount of oxygen to consume unreacted CO and HC. Likewise, under lean conditions when CO and HC are being oxidized, the OSC reacts with excess oxygen and/or $NO_x$. As a result, even in the presence of an atmosphere that oscillates between fuel rich and fuel lean air-to-fuel ratios, there is conversion of HC, CO, and $NO_x$ all at the same (or at essentially all the same) time. Typically, a TWC catalyst comprises one or more platinum group metals such as palladium and/or rhodium and optionally platinum; an oxygen storage component; and optionally promoters and/or stabilizers. Under rich conditions, TWC catalysts can generate ammonia.

"OSC" refers to an oxygen storage component, which is an entity that has multivalent oxidation states and can actively react with oxidants such as oxygen ($O_2$) or $NO_x$ under oxidative conditions, or reacts with reductants such as CO, HC, or hydrogen ($H_2$) under reduction conditions. Examples of suitable oxygen storage components include ceria and praseodymia. Delivery of an OSC to a washcoat layer can be achieved by the use of, for example, mixed oxides. For example, ceria can be delivered as a mixed oxide of cerium and zirconium, and/or a mixed oxide of cerium, zirconium, and neodymium. For example, praseodymia can be delivered as a mixed oxide of praseodymium and zirconium, and/or a mixed oxide of praseodymium, cerium, lanthanum, yttrium, zirconium, and neodymium.

"DOC" refers to a diesel oxidation catalyst, which converts hydrocarbons and carbon monoxide in the exhaust gas of a diesel engine. Typically, a DOC comprises one or more platinum group metals such as palladium and/or platinum; a support material such as alumina; zeolites for HC storage; and optionally promoters and/or stabilizers.

"LNT" refers to a lean $NO_x$ trap, which is a catalyst containing a platinum group metal, ceria, and an alkaline earth trap material suitable to adsorb $NO_x$ during lean conditions (for example, BaO or MgO). Under rich conditions, $NO_x$ is released and reduced to nitrogen.

"CSF" refers to a catalyzed soot filter, which is a wall-flow monolith. A wall-flow filter consists of alternating inlet channels and outlet channels, where the inlet channels are plugged on the outlet end and the outlet channels are plugged on the inlet end. A soot-carrying exhaust gas stream entering the inlet channels is forced to pass through the filter walls before exiting from the outlet channels. In addition to soot filtration and regeneration, A CSF may carry oxidation catalysts to oxidize CO and HC to $CO_2$ and $H_2O$, or oxidize NO to $NO_2$ to accelerate the downstream SCR catalysis or to facilitate the oxidation of soot particles at lower temperatures. A CSF, when positioned behind a LNT catalyst, can have a $H_2S$ oxidation functionality to suppress $H_2S$ emission during the LNT desulfation process.

"SCRoF" refers to an SCR catalyst composition coated directly onto a wall-flow filter.

"GDI" refers to a gasoline direct injection gasoline engine, which operates under lean burn conditions.

"AMO$_x$" refers to a selective ammonia oxidation catalyst, which is a catalyst containing one or more metals (typically Pt, although not limited thereto) and an SCR catalyst suitable to convert ammonia to nitrogen.

Unless otherwise indicated, all parts and percentages are by weight. "Weight percent (wt. %)," if not otherwise indicated, is based on an entire composition free of any volatiles, that is, based on dry solids content.

All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

All U.S. patent applications, published patent applications and patents referred to herein are hereby incorporated by reference.

I. Catalyst Compositions

The present disclosure provides a selective catalytic reduction (SCR) catalyst composition effective to catalyze the reduction of NO$_x$ from a lean burn engine exhaust gas in the presence of a reductant, the catalyst composition comprising a first component comprising a porous refractory metal oxide support having deposited thereon a platinum group metal (PGM) and a base metal oxide; and a second component comprising a zeolite promoted with a metal, wherein the weight ratio of the first component to the second component is in a range of from about 0.05 to about 0.5. In some embodiments, the weight ratio is from about 0.05, about 0.06, about 0.07, about 0.08, about 0.09, or about 0.1 to about 0.2, about 0.3, about 0.4, or about 0.5.

The porous refractory metal oxide support material on which the catalytically active PGM and base metal oxide are deposited exhibits chemical and physical stability at high temperatures, such as the temperatures associated with gasoline or diesel engine exhaust. Exemplary porous refractory metal oxides include alumina, silica, zirconia, titania, ceria, praseodymia, tin oxide and the like, as well as physical mixtures or chemical combinations thereof, including atomically-doped combinations and including high surface area or activated compounds such as activated alumina.

Porous refractory metal oxides that may be suitable for use to support the PGM component and base metal oxide include alumina, titania, zirconia; mixtures of alumina with one or more of titania, zirconia and ceria; ceria coated on alumina; or titania coated on alumina. The porous refractory metal oxide may contain an oxide or a mixed oxide such as silica-alumina, aluminosilicates which may be amorphous or crystalline, alumina-zirconia, alumina-chromia, alumina-ceria and the like. The porous refractory metal oxides are in particular gamma alumina, silica-alumina, ceria coated on alumina, titania coated on alumina or zirconia coated on alumina. Included are combinations of metal oxides such as silica-alumina, ceria-zirconia, praseodymia-ceria, alumina-zirconia, alumina-ceria-zirconia, lanthana-alumina, lanthana-zirconia-alumina, baria-alumina, baria-lanthana-alumina, baria-lanthana-neodymia alumina and alumina-ceria. Exemplary aluminas include large pore boehmite, gamma-alumina, and delta/theta alumina. Useful commercial aluminas used as starting materials in exemplary processes include activated aluminas, such as high bulk density gamma-alumina, low or medium bulk density large pore gamma-alumina and low bulk density large pore boehmite and gamma-alumina. In some embodiments, the porous refractory metal oxide comprises silica, alumina, ceria, zirconia, ceria-zirconia composite, titania, or combinations thereof.

The SCR catalyst composition may comprise any of the above-named porous refractory metal oxides and in any amount. For example, porous refractory metal oxide in the SCR catalyst composition may comprise from about 1 wt. %, about 5 wt. %, about 10 wt. %, about 15 wt. %, about 20 wt. %, about 25 wt. %, about 30 wt. % or about 35 wt. % to about 50 wt. %, about 55 wt. %, about 60 wt. % about 65 wt. % or about 70 wt. % based on the total dry weight of the catalyst composition. The porous refractory metal oxide may, for example, comprise from about 10 to about 99 wt. % alumina, from about 15 to about 95 wt. % alumina or from about 20 to about 85 wt. % alumina. In some embodiments, the porous refractory metal oxide comprises silica in an amount of from about 1% to about 20% by weight; and alumina in an amount of from about 80% to about 99% by weight.

In some embodiments, the PGM is selected from platinum, palladium, rhodium, and combinations thereof. The PGM may be dispersed on the porous refractory metal oxide support by, for example, dispersing a soluble precursor (e.g., palladium nitrate) thereon. Alternatively, the PGM is provided in particulate form in the composition, such as fine particles as small as 1 to 15 nanometers in diameter or smaller, as opposed to being dispersed on the support. The amount of the PGM deposited on the porous refractory metal oxide support may vary. In some embodiments, the PGM is present in an amount of about 0.01 to about 20% by weight of the porous refractory metal oxide support. In some embodiments, the PGM is present in an amount of about 0.01, about 0.02, about 0.03, about 0.04, about 0.05, about 0.06, about 0.07, about 0.08, about 0.09, or about 0.1, to about 0.5, about 1.0, about 2.0, about 5.0, about 10.0, or about 20% by weight of the porous refractory metal oxide support.

In some embodiments, the base metal oxide is an oxide of Ti, V, Cr, Mn, Fe, Co, Ni, Cu, Zn, Mo, Mo, Ag, Sn, or a combination thereof. In certain embodiments, the base metal oxide is CuO. The amount of the base metal oxide deposited on the porous refractory metal oxide support may vary. In some embodiments, the base metal oxide is present in an amount of from about 0.1 to about 20% by weight of the porous refractory metal oxide support. In some embodiments, the base metal oxide is present in an amount of from about 0.1, about 0.2, about 0.3, about 0.4, about 0.5, about 0.6, about 0.7, about 0.8, about 0.9, or about 1, to about 2, about 5, about 10, or about 20% by weight of the porous refractory metal oxide support.

The structure type of the zeolite promoted with a metal may vary. In some embodiments, the zeolite has a structure type selected from the group consisting of AEI, AFT, AFV, AFX, AVL, CHA, DDR, EAB, EEI, ERI, IFY, IRN, KFI, LEV, LTA, LTN, MER, MWF, NPT, PAU, RHO, RTE, RTH, SAS, SAT, SAV, SFW, TSC, UFI, and combinations thereof. In some embodiments, the zeolite has a structure type selected from the group consisting of CHA and AEI.

The metal promoting the zeolite is generally a base metal (e.g., a transition metal or lanthanide). In some embodiments, the metal promoting the zeolite is one or more of Cu, Co, Ni, La, Mn, Fe, V, Ag, Ce, Nd, Mo, Hf, Y, or W. In certain embodiments, the metal promoting the zeolite is one or more of Cu, Fe, or Ce. In certain embodiments, the metal promoting the zeolite is Cu. Reference to "metal" in this context allows for the presence of the metal in any valence state. For example, the metal promoting the zeolite may be in metallic form, with zero valence, or the metal may be in an oxide form. Generally, the metal promoting the zeolite will be present in an oxide form.

Catalyst compositions may be prepared using a binder, for example, a $ZrO_2$ binder derived from a suitable precursor such as zirconyl acetate or any other suitable zirconium precursor such as zirconyl nitrate. Zirconyl acetate binder provides a coating that remains homogeneous and intact after thermal aging, for example, when the catalyst is exposed to high temperatures of at least about 600° C., for example, about 800° C. and higher and high water vapor environments of about 5% or more. Other potentially suitable binders include, but are not limited to, alumina and silica. Alumina binders include aluminum oxides, aluminum hydroxides and aluminum oxyhydroxides. Aluminum salts and colloidal forms of alumina many also be used. Silica binders include various forms of $SiO_2$, including silicates and colloidal silica. Binder compositions may include any combination of zirconia, alumina and silica.

Other exemplary binders include boehemite, gamma-alumina, or delta/theta alumina, as well as silica sol. When present, the binder is typically used in an amount of about 1-5 wt. % of the total washcoat loading. Alternatively the binder can be zirconia-based or silica-based, for example zirconium acetate, zirconia sol or silica sol. When present, the alumina binder is typically used in an amount of about 0.05 g/in³ to about 1 g/in³.

Method of Making SCR Compositions

According to the present disclosure, a SCR catalyst composition is generally prepared by providing a first component comprising a porous refractory metal oxide support having deposited thereon a platinum group metal (PGM) and a base metal oxide; and providing a second component comprising a zeolite promoted with a metal, wherein the weight ratio of the first component to the second component is in a range from about 0.05 to about 0.5.

To prepare metal-promoted zeolites according to various embodiments of the invention, a metal (e.g., copper, iron, cerium, or the like) is ion-exchanged into the zeolite. Such metals are generally ion exchanged into alkali metal or $NH_4$ zeolites (which can be prepared by $NH_4$ ion exchange into an alkali metal zeolite by methods known in the art, e.g., as disclosed in Bleken, F. et al. Topics in Catalysis 2009, 52, 218-228, which is incorporated herein by reference).

Preparation of metal-promoted zeolites typically comprises an ion-exchange process of the zeolite in particulate form with a metal precursor solution. For example, a copper salt can be used to provide copper. When copper acetate is used to provide copper, the copper concentration of the liquid copper solution used in the copper ion-exchange is in specific embodiments in the range from about 0.01 to about 0.4 molar, more specifically in the range from about 0.05 to about 0.3 molar, even more specifically in the range from about 0.1 to about 0.25 molar, even more specifically in the range from about 0.125 to about 0.25 molar, even more specifically in the range from about 0.15 to about 0.225 molar and even more specifically in the range from about 0.2. In specific embodiments, a metal, such as copper, is ion exchanged into alkali metal or $NH_4$-Chabazite to form Cu-Chabazite. In addition, metal ions can be exchanged into a zeolite by using a solid metal oxide as a metal precursor and a proton or NHa form of zeolite as a zeolite precursor in a gas stream or a slurry environment. In this case, elevated temperatures may be needed to facilitate the exchange process. For solid-state exchange, certain moisture levels in the gas stream may also be beneficial.

For additional promotion of SCR of oxides of nitrogen, in some embodiments, the zeolite can be promoted with two or more metals (e.g., copper in combination with one or more other metals). Where two or more metals are to be included in a metal promoted zeolitic material, multiple metal precursors (e.g., copper and iron precursors) can be ion-exchanged at the same time or separately. In certain embodiments, the second metal can be exchanged into a zeolite material that has first been promoted with the first metal (e.g., a second metal can be exchanged into a copper-promoted zeolite material).

II. Catalytic Articles

In another aspect is provided an SCR article effective to catalyze the reduction of $NO_x$ from a lean burn engine exhaust gas in the presence of a reductant, the SCR article comprising a substrate having an inlet end and an outlet end defining an overall length, and the SCR catalyst composition as disclosed herein disposed thereon.

Substrates

In one or more embodiments, the present catalyst compositions are disposed on a substrate to form a catalytic article. Catalytic articles comprising the substrates are generally employed as part of an exhaust gas treatment system (e.g., catalyst articles including, but not limited to, articles including the SCR compositions disclosed herein). Useful substrates are 3-dimensional, having a length and a diameter and a volume, similar to a cylinder. The shape does not necessarily have to conform to a cylinder. The length is an axial length defined by an inlet end and an outlet end.

According to one or more embodiments, the substrate for the disclosed composition(s) may be constructed of any material typically used for preparing automotive catalysts and will typically comprise a metal or ceramic honeycomb structure. The substrate typically provides a plurality of wall surfaces upon which the washcoat composition is applied and adhered, thereby acting as a substrate for the catalyst composition.

Ceramic substrates may be made of any suitable refractory material, e.g. cordierite, cordierite-α-alumina, aluminum titanate, silicon titanate, silicon carbide, silicon nitride, zircon mullite, spodumene, alumina-silica-magnesia, zircon silicate, sillimanite, a magnesium silicate, zircon, petalite, α-alumina, an aluminosilicate and the like.

Substrates may also be metallic, comprising one or more metals or metal alloys. A metallic substrate may include any metallic substrate, such as those with openings or "punch-outs" in the channel walls. The metallic substrates may be employed in various shapes such as pellets, compressed metallic fibers, corrugated sheet or monolithic foam. Specific examples of metallic substrates include heat-resistant, base-metal alloys, especially those in which iron is a substantial or major component. Such alloys may contain one or more of nickel, chromium, and aluminum, and the total of these metals may advantageously comprise at least about 15 wt. % (weight percent) of the alloy, for instance, about 10 to about 25 wt. % chromium, about 1 to about 8 wt. % of aluminum, and from 0 to about 20 wt. % of nickel, in each case based on the weight of the substrate. Examples of metallic substrates include those having straight channels;

those having protruding blades along the axial channels to disrupt gas flow and to open communication of gas flow between channels; and those having blades and also holes to enhance gas transport between channels allowing for radial gas transport throughout the monolith.

Any suitable substrate for the catalytic articles disclosed herein may be employed, such as a monolithic substrate of the type having fine, parallel gas flow passages extending there through from an inlet or an outlet face of the substrate such that passages are open to fluid flow there through ("flow-through substrate"). Another suitable substrate is of the type have a plurality of fine, substantially parallel gas flow passages extending along the longitudinal axis of the substrate where, typically, each passage is blocked at one end of the substrate body, with alternate passages blocked at opposite end-faces ("wall-flow filter"). Flow-through and wall-flow substrates are also taught, for example, in International Application Publication No. WO2016/070090, which is incorporated herein by reference in its entirety.

In some embodiments, the catalyst substrate comprises a honeycomb substrate in the form of a wall-flow filter or a flow-through substrate. In some embodiments, the substrate is a wall-flow filter. In some embodiments, the substrate is a flow-through substrate. Flow-through substrates and wall-flow filters will be further discussed herein below.

Flow-Through Substrates

In some embodiments, the substrate is a flow-through substrate (e.g., monolithic substrate, including a flow-through honeycomb monolithic substrate). Flow-through substrates have fine, parallel gas flow passages extending from an inlet end to an outlet end of the substrate such that passages are open to fluid flow. The passages, which are essentially straight paths from their fluid inlet to their fluid outlet, are defined by walls on or in which a catalytic coating is disposed so that gases flowing through the passages contact the catalytic material. The flow passages of the flow-through substrate are thin-walled channels, which can be of any suitable cross-sectional shape and size such as trapezoidal, rectangular, square, sinusoidal, hexagonal, oval, circular, etc. The flow-through substrate can be ceramic or metallic as described above.

Flow-through substrates can, for example, have a volume of from about 50 $in^3$ to about 1200 $in^3$, a cell density (inlet openings) of from about 60 cells per square inch (cpsi) to about 500 cpsi or up to about 900 cpsi, for example from about 200 to about 400 cpsi and a wall thickness of from about 50 to about 200 microns or about 400 microns.

Wall-Flow Filter Substrates

In some embodiments, the substrate is a wall-flow filter, which generally has a plurality of fine, substantially parallel gas flow passages extending along the longitudinal axis of the substrate. Typically, each passage is blocked at one end of the substrate body, with alternate passages blocked at opposite end-faces. Such monolithic wall-flow filter substrates may contain up to about 900 or more flow passages (or "cells") per square inch of cross-section, although far fewer may be used. For example, the substrate may have from about 7 to 600, more usually from about 100 to 400, cells per square inch ("cpsi"). The cells can have cross-sections that are rectangular, square, circular, oval, triangular, hexagonal, or are of other polygonal shapes. The wall-flow filter substrate can be ceramic or metallic as described above.

Figure 1B:
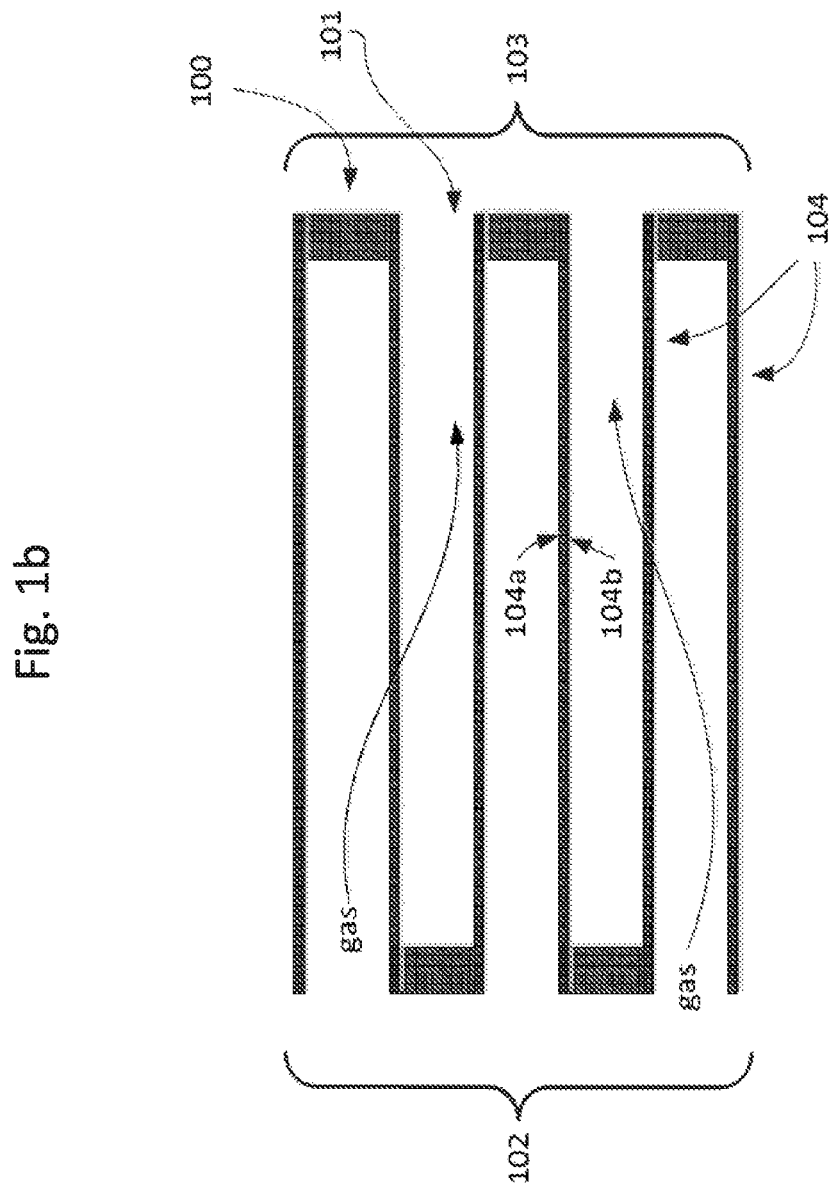
FIG. 1b is a cross-sectional view of a section of a wall-flow filter substrate.

Referring to FIG. 1a, the exemplary wall-flow filter substrate has a cylindrical shape and a cylindrical outer surface having a diameter D and an axial length L. FIG. 1b is a perspective view of an exemplary wall-flow filter. A cross-section view of a monolithic wall-flow filter substrate section is illustrated in FIG. 1b, showing alternating plugged and open passages (cells). Blocked or plugged ends 100 alternate with open passages 101, with each opposing end open and blocked, respectively. The filter has an inlet end 102 and outlet end 103. The arrows crossing porous cell walls 104 represent exhaust gas flow entering the open cell ends, diffusion through the porous cell walls 104 and exiting the open outlet cell ends. Plugged ends 100 prevent gas flow and encourage diffusion through the cell walls. Each cell wall will have an inlet side 104a and outlet side 104b. The passages are enclosed by the cell walls.

The wall-flow filter article substrate may have a volume of, for instance, from about 50 $cm^3$, about 100 $in^3$, about 200 $in^3$, about 300 $in^3$, about 400 $in^3$, about 500 $in^3$, about 600 $in^3$, about 700 $in^3$, about 800 $in^3$, about 900 $in^3$ or about 1000 $in^3$ to about 1500 $in^3$, about 2000 $in^3$, about 2500 $in^3$, about 3000 $in^3$, about 3500 $in^3$, about 4000 $in^3$, about 4500 $in^3$ or about 5000 $in^3$. Wall-flow filter substrates typically have a wall thickness from about 50 microns to about 2000 microns, for example from about 50 microns to about 450 microns or from about 150 microns to about 400 microns.

The walls of the wall-flow filter are porous and generally have a wall porosity of at least about 40% or at least about 50% with an average pore diameter of at least about 10 microns prior to disposition of the functional coating. For instance, the wall-flow filter article substrate in some embodiments will have a porosity of ≥40%, ≥50%, ≥60%, ≥65% or ≥70%. For instance, the wall-flow filter article substrate will have a wall porosity of from about 50%, about 60%, about 65% or about 70% to about 75% and an average pore diameter of from about 10, or about 20, to about 30, or about 40 microns prior to disposition of a catalytic coating. The terms "wall porosity" and "substrate porosity" mean the same thing and are interchangeable. Porosity is the ratio of void volume (or pore volume) divided by the total volume of a substrate material. Pore size and pore size distribution are typically determined by Hg porosimetry measurement.

Substrate Coating Process

To produce SCR catalytic articles of the present disclosure, a substrate as described herein is coated with an SCR catalyst composition as disclosed herein. The coatings are "catalytic coating compositions" or "catalytic coatings." A "catalyst composition" and a "catalytic coating composition" are synonymous.

Generally, the catalyst composition is prepared and coated on a substrate. This method can comprise mixing the catalyst composition (or one or more components of the catalyst composition) as generally disclosed herein with a solvent (e.g., water) to form a slurry for purposes of coating a catalyst substrate. In addition to the catalyst composition (i.e., the porous refractory metal oxide, PGM, base metal oxide, zeolite and metal), the slurry may optionally contain various additional components. Typical additional components include, but are not limited to, binders as described herein above, additives to control, e.g., pH and viscosity of the slurry. Additional components can include hydrocarbon (HC) storage components (e.g., zeolites), associative thickeners, and/or surfactants (including anionic, cationic, nonionic or amphoteric surfactants). A typical pH range for the slurry is about 3 to about 6. Addition of acidic or basic species to the slurry can be carried out to adjust the pH accordingly. For example, in some embodiments, the pH of the slurry is adjusted by the addition of aqueous acetic acid.

The slurry can be milled to reduced particle size and to enhance mixing of the particles and formation of a homogenous material. The milling can be accomplished in a ball mill, continuous mill, or other similar equipment, and the solids content of the slurry may be, e.g., about 20-60 wt. %, more particularly about 20-40 wt. %. In one embodiment, the post-milling slurry is characterized by a D90 particle size of about 1 to about 40 microns, preferably 2 to about 20 microns, more preferably about 4 to about 15 microns.

The present catalyst compositions may typically be applied in the form of one or more washcoats containing the SCR catalyst composition components as disclosed herein. A washcoat is formed by preparing a slurry containing a specified solids content (e.g., about 10 to about 60% by weight) of catalyst composition (or one or more components of the catalyst composition) in a liquid vehicle, which is then applied to a substrate using any washcoat technique known in the art and dried and calcined to provide a coating layer. If multiple coatings are applied, the substrate is dried and/or calcined after each washcoat is applied and/or after the number of desired multiple washcoats are applied. In one or more embodiments, the catalytic material(s) are applied to the substrate as a washcoat.

After calcining, the catalyst loading obtained by the above described washcoat technique can be determined through calculation of the difference in coated and uncoated weights of the substrate. As will be apparent to those of skill in the art, the catalyst loading can be modified by altering the slurry rheology. In addition, the coating/drying/calcining process to generate a washcoat layer (coating layer) can be repeated as needed to build the coating to the desired loading level or thickness, meaning more than one washcoat may be applied.

The present catalytic coating may comprise one or more coating layers, where at least one layer comprises the present catalyst composition or one or more components of the catalyst composition. The catalytic coating may comprise one or more thin, adherent coating layers disposed on and in adherence to least a portion of a substrate. The entire coating comprises the individual "coating layers".

In some embodiments, the present catalytic articles may include the use of one or more catalyst layers and combinations of one or more catalyst layers. Catalytic materials may be present on the inlet side of the substrate wall alone, the outlet side alone, both the inlet and outlet sides, or the wall itself may consist all, or in part, of the catalytic material. The catalytic coating may be on the substrate wall surfaces and/or in the pores of the substrate walls, that is "in" and/or "on" the substrate walls. Thus, the phrase "a washcoat disposed on the substrate" means on any surface, for example on a wall surface and/or on a pore surface.

The washcoat(s) can be applied such that different coating layers may be in direct contact with the substrate. Alternatively, one or more "undercoats" may be present, so that at least a portion of a catalytic coating layer or coating layers are not in direct contact with the substrate (but rather, are in contact with the undercoat). One or more "overcoats" may also be present, so that at least a portion of the coating layer or layers are not directly exposed to a gaseous stream or atmosphere (but rather, are in contact with the overcoat).

Alternatively, the present catalyst composition may be in a top coating layer over a bottom coating layer. The catalyst composition may be present in a top and a bottom layer. Any one layer may extend the entire axial length of the substrate, for instance a bottom layer may extend the entire axial length of the substrate and a top layer may also extend the entire axial length of the substrate over the bottom layer. Each of the top and bottom layers may extend from either the inlet or outlet end.

For example, both bottom and top coating layers may extend from the same substrate end where the top layer partially or completely overlays the bottom layer and where the bottom layer extends a partial or full length of the substrate and where the top layer extends a partial or full length of the substrate. Alternatively, a top layer may overlay a portion of a bottom layer. For example, a bottom layer may extend the entire length of the substrate and the top layer may extend about 10%, about 20%, about 30%, about 40%, about 50%, about 60%, about 70%, about 80% or about 90% of the substrate length, from either the inlet or outlet end.

Alternatively, a bottom layer may extend about 10%, about 15%, about 25%, about 30%, about 40%, about 45%, about 50%, about 55%, about 60%, about 65%, about 70%, about 75%, about 80%, about 85% or about 95% of the substrate length from either the inlet end or outlet end and a top layer may extend about 10%, about 15%, about 25%, about 30%, about 40%, about 45%, about 50%, about 55%, about 60%, about 65%, about 70%, about 75%, about 80%, about 85% or about 95% of the substrate length from either the inlet end of outlet end, wherein at least a portion of the top layer overlays the bottom layer. This "overlay" zone may for example extend from about 5% to about 80% of the substrate length, for example about 5%, about 10%, about 20%, about 30%, about 40%, about 50%, about 60% or about 70% of the substrate length.

In some embodiments, the SCR catalyst composition as disclosed herein, disposed on the substrate as disclosed herein, comprises a first washcoat comprising a mixture of (a) the porous refractory metal oxide support having deposited thereon the PGM component and the base metal oxide; and (b) the zeolite promoted with the metal component, wherein the first washcoat is disposed on at least a portion of the length of the catalyst substrate; and a second washcoat comprising the zeolite promoted with the metal component, wherein the second washcoat is disposed on at least a portion of the length of the catalyst substrate.

In some embodiments, the first washcoat is disposed directly on the catalyst substrate, and the second washcoat is disposed on at least a portion of the first washcoat. In some embodiments, the second washcoat is disposed directly on the catalyst substrate, and the first washcoat is disposed on at least a portion of the second washcoat. In some embodiments, the first washcoat is disposed directly on the catalyst substrate from the inlet end to a length of from about 10% to about 50% of the overall length; and the second washcoat is disposed on at least a portion of the first washcoat. In some embodiments, the second washcoat is disposed directly on the catalyst substrate from the inlet end to a length of from about 50% to about 100% of the overall length; and the first washcoat is disposed on at least a portion of the second washcoat. In some embodiments, the first washcoat is disposed directly on the catalyst substrate from the inlet end to a length of from about 20% to about 40% of the overall length, and the second washcoat extends from the inlet end to the outlet end. In some embodiments, the first washcoat is disposed directly on the catalyst substrate from the outlet end to a length of from about 10% to about 50% of the overall length, and the second washcoat is disposed on at least a portion of the first washcoat. In some embodiments, the first washcoat is disposed directly on the catalyst substrate from the outlet end to a length from about 20 to about 40% of the overall length, and the second washcoat extends from the inlet end to the outlet end. In some embodiments, the second washcoat is disposed directly on the catalyst substrate from the outlet end to a length of from about 50% to about 100% of the overall length, and the first washcoat is disposed on at least a portion of the second washcoat. In some embodiments, the first washcoat is disposed directly on the catalyst substrate covering 100% of the overall length, and the second washcoat is disposed on the first washcoat covering 100% of the overall length. In some embodiments, the second washcoat is disposed directly on the catalyst substrate covering 100% of the overall length, and the first washcoat is disposed on the second washcoat covering 100% of the overall length.

The catalytic coating may advantageously be "zoned," comprising zoned catalytic layers, that is, where the catalytic coating contains varying compositions across the axial length of the substrate. This may also be described as "laterally zoned". For example, a layer may extend from the inlet end towards the outlet end extending about 10%, about 20%, about 30%, about 40%, about 50%, about 60%, about 70%, about 80%, or about 90% of the substrate length. Another layer may extend from the outlet end towards the inlet end extending about 10%, about 20%, about 30%, about 40%, about 50%, about 60%, about 70%, about 80%, or about 90% of the substrate length. Different coating layers may be adjacent to each other and not overlay each other. Alternatively, different layers may overlay a portion of each other, providing a third "middle" zone. The middle zone may, for example, extend from about 5% to about 80% of the substrate length, for example about 5%, about 10%, about 20%, about 30%, about 40%, about 50%, about 60% or about 70% of the substrate length.

Zones of the present disclosure are defined by the relationship of coating layers. With respect to different coating layers, there are a number of possible zoning configurations. For example, there may be an upstream zone and a downstream zone, there may be an upstream zone, a middle zone and a downstream zone, there may four different zones, etc. Where two layers are adjacent and do not overlap, there are upstream and downstream zones. Where two layers overlap to a certain degree, there are upstream, downstream and middle zones. Where for example, a coating layer extends the entire length of the substrate and a different coating layer extends from the outlet end a certain length and overlays a portion of the first coating layer, there are upstream and downstream zones.

For instance, the article may comprise an upstream zone comprising the first washcoat layer comprising a mixture of (a) the porous refractory metal oxide support having deposited thereon the PGM component and the base metal oxide; and (b) the zeolite promoted with the metal component; and a downstream zone comprising the second washcoat layer comprising the zeolite promoted with the metal component.

Alternatively, an upstream zone may comprise the second washcoat layer and a downstream zone may comprise the first washcoat layer.

In some embodiments, the first washcoat is disposed on the catalyst substrate from the inlet end to a length of from about 10% to about 50% of the overall length; and the second washcoat is disposed on the catalyst substrate from the outlet end to a length of from about 50% to about 90% of the overall length. In some embodiments, the first washcoat is disposed on the catalyst substrate from the outlet end to a length of from about 10% to about 50% of the overall length; and wherein the second washcoat is disposed on the catalyst substrate from the inlet end to a length of from about 50% to about 90% of the overall length.

In some embodiments, the first washcoat has a porous refractory metal oxide-to-zeolite weight ratio of from about 0.1 to about 10. In some embodiments, the first washcoat has a porous refractory metal oxide-to-zeolite weight ratio of from about 0.2 to about 5. In some embodiments, the first washcoat has a porous refractory metal oxide-to-zeolite weight ratio of about 0.25.

Figure 2A:
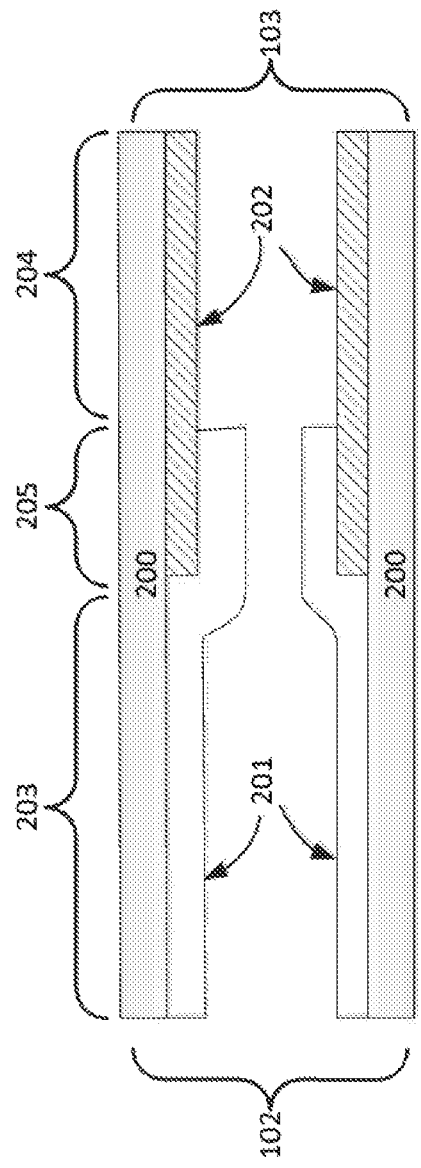
FIGS. 2a, 2b, and 2c are illustrations of three possible coating configurations according to certain embodiments.
Figure 2B:
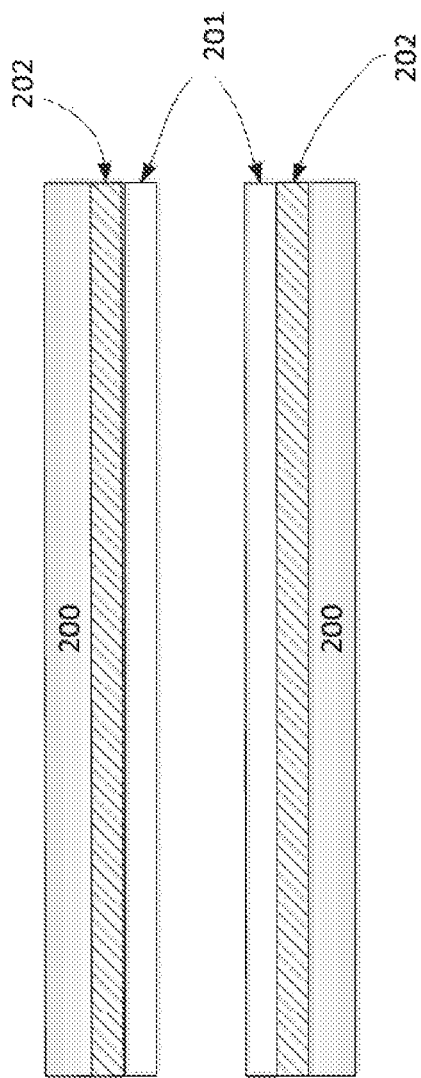
Figure 2C:
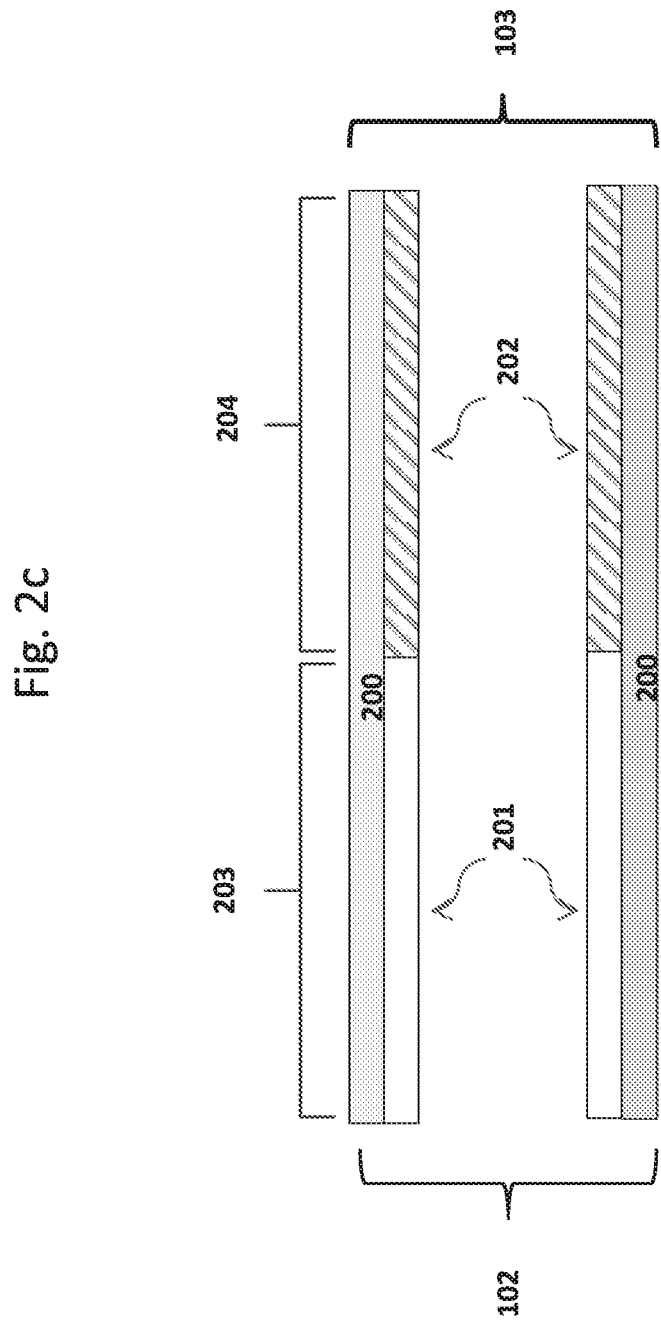

FIGS. 2a, 2b, and 2c show some possible coating layer configurations with two coating layers. Shown are substrate walls 200 onto which coating layers 201 (top coat) and 202 (bottom coat) are disposed. This is a simplified illustration, and in the case of a porous wall-flow substrate, not shown are pores and coatings in adherence to pore walls and not shown are plugged ends. In FIG. 2a, bottom coating layer 202 extends from the outlet about 50% of the substrate length and top coating layer 201 extends from the inlet greater than 50% of the length and overlays a portion of layer 202, providing an upstream zone 203, a middle overlay zone 205 and a downstream zone 204. In FIG. 2b, coating layers 201 and 202 each extend the entire length of the substrate with top layer 201 overlaying bottom layer 202. The substrate of FIG. 2b does not contain a zoned coating configuration. FIG. 2c is illustrative of a zoned configuration having a coating layer 202 which extends from the outlet about 50% of the substrate length to form a downstream zone 204, and a coating layer 201 which extends from the inlet about 50% of the substrate length, providing an upstream zone 203. FIGS. 2a, 2b, and 2c may be useful to illustrate coating compositions on a wall-through substrate or the flow-through substrate.

The SCR article as disclosed herein is effective to catalyze the reduction of $NO_x$ from a lean burn engine exhaust gas in the presence of a reductant. Present articles are effective to catalyze the reduction of $NO_x$ over a variety of temperatures, and are particularly effective at lower temperatures. In some embodiments, the effective reduction of $NO_x$ is at a temperature that is above about 150° C. and below about 700° C. In some embodiments, the effective reduction of $NO_x$ is at a temperature of from about 200° C. to about 600° C. In some embodiments, the conversion of $NO_x$ is increased by at least 10% at 200° C. relative to a reference catalytic article having only a copper-chabazite washcoat disposed on the substrate. In some embodiments, the conversion of $NO_x$ is increased by 40% or more at 200° C. relative to a reference catalytic article having only a copper-chabazite washcoat disposed on the substrate. In some embodiments, the conversion of $NO_x$ is increased by 10% at 200° C. relative to a reference catalytic article having only a copper-chabazite washcoat disposed on the substrate. In some embodiments, the conversion of $NO_x$ to nitrogen ($N_2$) and water is increased by 15%, 20%, 25%, 30%, 40%, 50%, 60%, 70%, 80%, or more at 200° C. relative to a reference catalytic article having only a copper-chabazite washcoat disposed on the substrate.

III. Exhaust Gas Treatment Systems

In a further aspect is provided an exhaust gas treatment system comprising a lean burn engine that produces an exhaust gas stream and the SCR article as disclosed herein. The engine can be, e.g., a diesel engine which operates at combustion conditions with air in excess of that required for stoichiometric combustion, i.e. lean conditions. In other embodiments, the engine can be a lean burn gasoline engine or an engine associated with a stationary source (e.g., electricity generators or pumping stations). Exhaust gas treatment systems generally contain more than one catalytic article positioned downstream from the engine in fluid communication with the exhaust gas stream. A system may contain, for instance, a selective catalytic reduction catalyst (SCR) as disclosed herein, a diesel oxidation catalyst (DOC) and one or more articles containing a reductant injector, a soot filter, an ammonia oxidation catalyst (AMOx) or a lean NOx trap (LNT). An article containing a reductant injector is a reduction article. A reduction system includes a reductant injector and/or a pump and/or a reservoir, etc. The present treatment system may further comprise a soot filter and/or an ammonia oxidation catalyst. A soot filter may be uncatalyzed or may be catalyzed (CSF). For instance, the present treatment system may comprise, from upstream to downstream—an article containing a DOC, a CSF, an urea injector, a SCR article and an article containing an AMOx. A lean NOx trap (LNT) may also be included.

The relative placement of the various catalytic components present within the emission treatment system can vary. In the present exhaust gas treatment systems and methods, the exhaust gas stream is received into the article(s) or treatment system by entering the upstream end and exiting the downstream end. The inlet end of a substrate or article is synonymous with the "upstream" end or "front" end. The outlet end is synonymous with the "downstream" end or "rear" end. The treatment system is, in general, downstream of and in fluid communication with an internal combustion engine.

Figure 3:
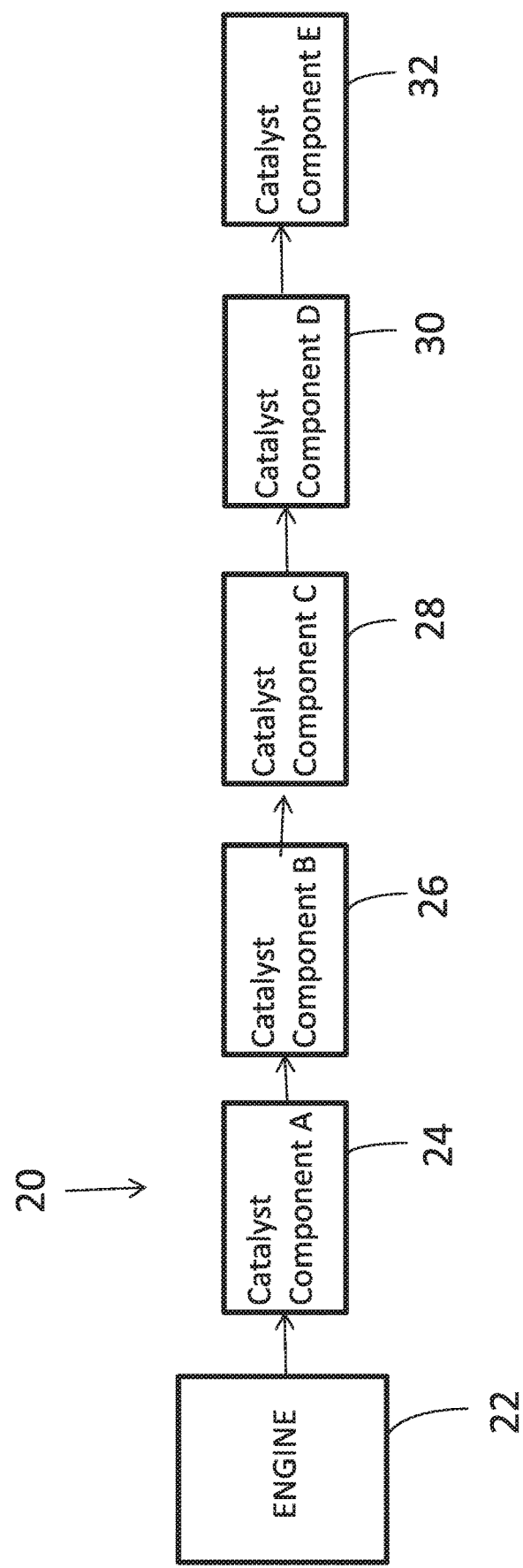
FIG. 3 shows a schematic depiction of an embodiment of an emission treatment system in which an SCR catalyst article of the present invention is utilized.

One exemplary emission treatment system is illustrated in FIG. 3, which depicts a schematic representation of an emission treatment system 20. As shown, the emission treatment system can include a plurality of catalyst components in series downstream of an engine 22, such as a lean burn gasoline engine. At least one of the catalyst components will be the SCR catalyst of the invention as set forth herein. The catalyst composition of the invention could be combined with numerous additional catalyst materials and could be placed at various positions in comparison to the additional catalyst materials. FIG. 3 illustrates five catalyst components, 24, 26, 28, 30, 32 in series; however, the total number of catalyst components can vary and five components is merely one example.

Without limitation, Table 1 presents various exhaust gas treatment system configurations of one or more embodiments. It is noted that each catalyst is connected to the next catalyst via exhaust conduits such that the engine is upstream of catalyst A, which is upstream of catalyst B, which is upstream of catalyst C, which is upstream of catalyst D, which is upstream of catalyst E (when present). The reference to Components A-E in the table can be cross-referenced with the same designations in FIG. 3.

The LNT catalyst noted in Table 1 can be any catalyst conventionally used as a $NO_x$ trap, and typically comprises $NO_x$-adsorber compositions that include base metal oxides (BaO, MgO, $CeO_2$, and the like) and a platinum group metal for catalytic NO oxidation and reduction (e.g., Pt and Rh).

The LT-NA catalyst noted in Table 1 can be any catalyst that can adsorb $NO_x$ (e.g., NO or $NO_2$) at low temperatures (<250° C.) and release it to the gas stream at high temperatures (>250° C.). The released $NO_x$ is generally converted to $N_2$ and $H_2O$ over a down-stream SCR or SCRoF catalyst. Typically, a LT-NA catalyst comprises Pd-promoted zeolites or Pd-promoted refractory metal oxides.

Reference to SCR in the table refers to an SCR catalyst, which may include the SCR catalyst composition of the invention. Reference to SCRoF (or SCR on filter) refers to a particulate or soot filter (e.g., a wall-flow filter), which can include the SCR catalyst composition of the invention. Where both SCR and SCRoF are present, one or both can include the SCR catalyst of the invention, or one of the catalysts could include a conventional SCR catalyst (e.g., SCR catalyst with conventional metal loading level).

Reference to AMOx in the table refers to an ammonia oxidation catalyst, which can be provided downstream of the catalyst of one or more embodiments of the invention to remove any slipped ammonia from the exhaust gas treatment system. In specific embodiments, the AMOx catalyst may comprise a PGM component. In one or more embodiments, the AMOx catalyst may comprise a bottom coat with PGM and a top coat with SCR functionality.

As recognized by one skilled in the art, in the configurations listed in Table 1, any one or more of components A, B, C, D, or E can be disposed on a particulate filter, such as a wall flow filter, or on a flow-through honeycomb substrate. In one or more embodiments, an engine exhaust system comprises one or more catalyst compositions mounted in a position near the engine (in a close-coupled position, CC), with additional catalyst compositions in a position underneath the vehicle body (in an underfloor position, UF). In one or more embodiments, the exhaust gas treatment system may further comprise a urea injection component.

TABLE 1

Possible exhaust gas treatment system configurations

| Component A | Component B | Component C | Component D | Component E |
|---|---|---|---|---|
| DOC | SCR | Optional AMOx | — | — |
| DOC | SCRoF | Optional AMOx | — | — |
| DOC | SCRoF | SCR | Optional AMOx | — |
| DOC | SCR | SCRoF | Optional AMOx | — |
| DOC | CSF | SCR | Optional AMOx | — |
| LNT | CSF | SCR | Optional AMOx | — |
| LNT | SCRoF | SCR | Optional AMOx | — |
| DOC/LT-NA | SCRoF | SCR | Optional AMOx | — |
| DOC/LT-NA and/or LNT | SCRoF | SCR | Optional AMOx | — |
| DOC/LT-NA and/or LNT | CSF | SCR | Optional AMOx | — |

Method of Treating Engine Exhaust

Another aspect of the present invention is directed to a method of treating the exhaust gas stream of a lean burn engine, particularly a lean burn gasoline engine or diesel engine. The method can include placing the SCR catalyst article according to one or more embodiments of the invention downstream from an engine and flowing the engine exhaust gas stream over the catalyst. In one or more embodiments, the method further comprising placing additional catalyst components downstream from the engine as noted above. The present catalyst compositions, articles, systems, and methods are suitable for treatment of exhaust gas streams of internal combustion engines, for example gasoline, light-duty diesel and heavy duty diesel engines. The catalyst compositions are also suitable for treatment of emissions from stationary industrial processes, removal of noxious or toxic substances from indoor air or for catalysis in chemical reaction processes.

It will be readily apparent to one of ordinary skill in the relevant arts that suitable modifications and adaptations to the compositions, methods, and applications described herein can be made without departing from the scope of any embodiments or aspects thereof. The compositions and methods provided are exemplary and are not intended to limit the scope of the claimed embodiments. All of the various embodiments, aspects, and options disclosed herein can be combined in all variations. The scope of the compositions, formulations, methods, and processes described herein include all actual or potential combinations of embodiments, aspects, options, examples, and preferences herein. All patents and publications cited herein are incorporated by reference herein for the specific teachings thereof as noted, unless other specific statements of incorporation are specifically provided The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

EXPERIMENTAL

Aspects of the present invention are more fully illustrated by the following examples, which are set forth to illustrate certain aspects of the present invention and are not to be construed as limiting thereof.

Example 1. Preparation of SCR Compositions and Articles (SCRoF)

Examples of the selective catalytic reduction (SCR) catalyst compositions according to certain embodiments as disclosed herein, disposed on a filter substrate (SCRoF articles), were made by washcoating SCR catalytic components on a high porosity SiC filter substrate. The SiC substrate was a square segment (34 mm×34 mm×152 mm), having a porosity of 63%, a mean pore size of 23 •m, a cell density of 300 cell/in$^2$ and a wall thickness of 0.3 mm. The substrate had an asymmetric cell design, with a larger opening for the inlet channels and a small opening for the outlet channels. Therefore, this type of cell design allowed the filter to hold more ash compared to a symmetric design without excessively increasing the back pressure of the filter.

Two types of slurries were coated on the substrate sequentially, one containing Pt and the other containing Cu-CHA. The main ingredient of the Pt-containing slurry was a Pt—CuO powder, which was made by sequentially impregnating a Pt-amine precursor and copper nitrate solution on an alumina-based support (5% $SiO_2$ doped alumina). A calcination treatment (500° C./2 h) was applied after each impregnation. Some of the Pt—CuO powders were further calcined at 800° C. for 4 h. The detailed description of the supported Pt—CuO powders is provided in Table 2.

TABLE 2

Description of Pt-CuO powder compositions and thermal treatments.

| Powder ID | Pt loading (wt %) | CuO loading (wt %) | 1$^{st}$ Calcination (temp/time) | 2$^{nd}$ Calcination (temp/time) |
|---|---|---|---|---|
| P1 | 2.9 | 0 | 500° C./2 h | None |
| P2 | 2.9 | 0 | 500° C./2 h | 800° C./4 h |
| P3 | 2.9 | 5.0 | 500° C./2 h | None |
| P4 | 2.9 | 5.0 | 500° C./2 h | 800° C./4 h |
| P5 | 2.9 | 2.5 | 500° C./2 h | None |
| P6 | 2.9 | 2.5 | 500° C./2 h | 800° C./4 h |
| P7 | 2.9 | 10.0 | 500° C./2 h | None |
| P8 | 2.9 | 10.0 | 500° C./2 h | 800° C./4 h |

Figure 4:
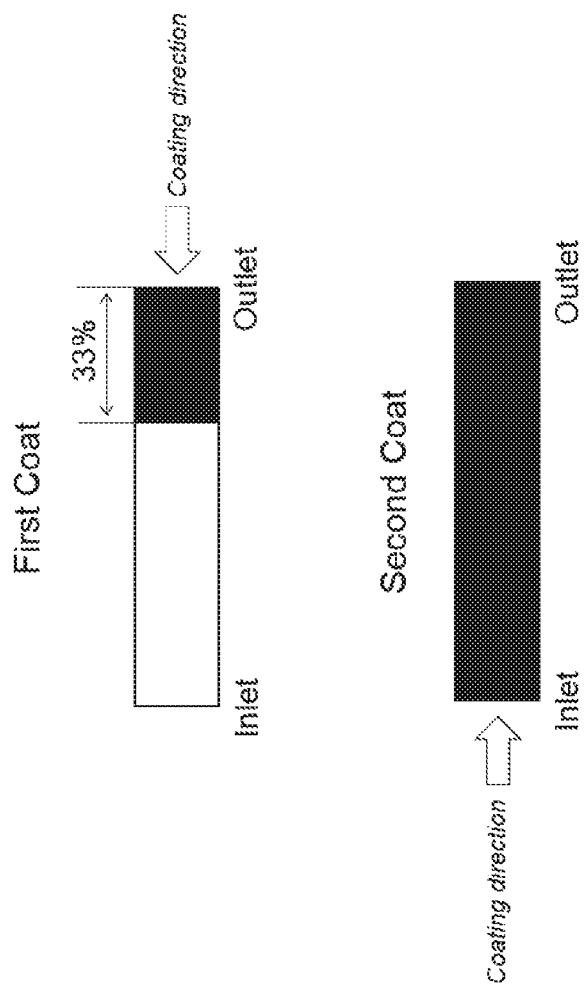
FIG. 4 is a schematic representation of one embodiment of a zoning design and coating sequence.

Table 3 provides the coating designs of SCRoF articles according to certain embodiments of the present disclosure where the Pt-containing slurry was coated as the first coat. The reference sample for this group of articles was a Cu-CHA only formulation (S0), without any Pt component. Articles S1 to S10 contained various formulations of Pt-containing powder as a part of a first coat slurry. Articles S1 to S8 also contained some Cu-CHA in their first coat slurry, whereas articles S9 and 10 contained an $Al_2O_3$ material in the first coat. The Pt-containing slurry covered 33% of the filter length from the outlet face. The second coat for S1 to S10 was the same (e.g., Cu-CHA coated from the inlet end covering 100% of the filter). A calcination (450° C. for 1 h) step was performed after each coating. The washcoat zoning design and coating sequence for articles S1 to S10 is illustrated in FIG. 4.

TABLE 3

Catalyst article designs with Pt-CuO powder in the first coat (S1-S10)*

| Article ID | Pt-CuO powder (g/in$^3$) | Cu-CHA (g/in$^3$) | $Al_2O_3$ (g/in$^3$) | Washcoat coverage (%) | Coating direction |
|---|---|---|---|---|---|
| S0 | None | 1.0 | None | 100 | Inlet |
| S1 | 0.1P1 | 0.4 | None | 33 | Outlet |
| S2 | 0.1P2 | 0.4 | None | 33 | Outlet |
| S3 | 0.1P3 | 0.4 | None | 33 | Outlet |
| S4 | 0.1P4 | 0.4 | None | 33 | Outlet |
| S5 | 0.1P5 | 0.4 | None | 33 | Outlet |
| S6 | 0.1P6 | 0.4 | None | 33 | Outlet |
| S7 | 0.1P7 | 0.4 | None | 33 | Outlet |
| S8 | 0.1P8 | 0.4 | None | 33 | Outlet |
| S9 | 0.1P1 | None | 0.4 | 33 | Outlet |
| S10 | 0.1P2 | None | 0.4 | 33 | Outlet |

*The second coat for S1-S10 was 1 g/in$^3$ Cu-CHA coated from the inlet covering 100% of the filter length. The $Al_2O_3$ in S9 and S10 was 5% $SiO_2$ doped alumina. The reference S0 was made with one coat.

Figure 5:
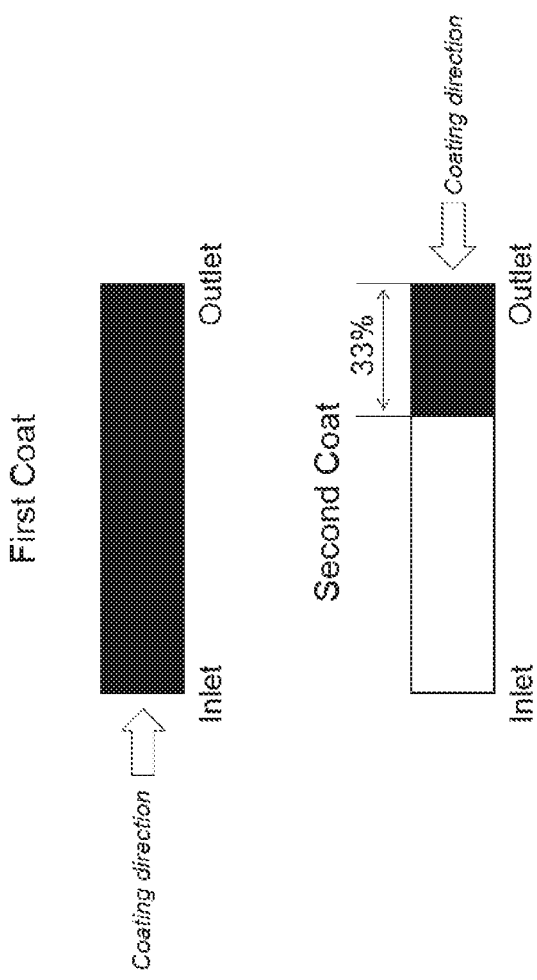
FIG. 5 is a schematic representation of one embodiment of a zoning design and coating sequence.

Table 4 shows the coating designs of the SCRoF articles according to certain embodiments, where the Pt-containing slurry was coated as the second coat (S11 to S20). Cu-CHA was first coated on the filter substrate from the inlet end with 100% coverage. The second coat was the Pt-containing coat, a combination of the Pt—CuO powder (shown in Table 2) and Cu-CHA or $Al_2O_3$. The second coat was coated from the outlet end, covering 33% of the length. Articles S11 to S20 are the mirror image designs of articles 1 to 10. The washcoat zoning design and coating sequence for articles S11 to S20 is schematically illustrated in FIG. 5.

TABLE 4

Catalyst designs with Pt-CuO powder in the second coat (S11-S20)*

| Article ID | Pt-CuO powder (g/in$^3$) | Cu-CHA (g/in$^3$) | $Al_2O_3$ (g/in$^3$) | Washcoat coverage (%) | Coating direction |
|---|---|---|---|---|---|
| S0 | None | 1.0 | None | 100 | Inlet |
| S11 | 0.1P1 | 0.4 | None | 33 | Outlet |
| S12 | 0.1P2 | 0.4 | None | 33 | Outlet |
| S13 | 0.1P3 | 0.4 | None | 33 | Outlet |
| S14 | 0.1P4 | 0.4 | None | 33 | Outlet |
| S15 | 0.1P5 | 0.4 | None | 33 | Outlet |

TABLE 4-continued

Catalyst designs with Pt-CuO powder in the second coat (S11-S20)*

| Article ID | Pt-CuO powder (g/in$^3$) | Cu-CHA (g/in$^3$) | Al$_2$O$_3$ (g/in$^3$) | Washcoat coverage (%) | Coating direction |
|---|---|---|---|---|---|
| S16 | 0.1P6 | 0.4 | None | 33 | Outlet |
| S17 | 0.1P7 | 0.4 | None | 33 | Outlet |
| S18 | 0.1P8 | 0.4 | None | 33 | Outlet |
| S19 | 0.1P1 | None | 0.4 | 33 | Outlet |
| S20 | 0.1P2 | None | 0.4 | 33 | Outlet |

*The first coat for S11-S20 was 1 g/in$^3$ Cu-CHA coated from the inlet covering 100% of the filter length. The Al$_2$O$_3$ in S19 and S20 was 5% SiO$_2$ doped alumina. The reference sample S0 was made with one coat.

Example 2. Catalyst Article Evaluation

The above identified catalyst articles were tested in a steady-state lab reactor capable of flowing 200 L/min of gas. The reaction feed contained 500 ppm NO, 550 ppm NH$_3$, (NH$_3$/NO$_x$=1.1), 500 ppm CO, 10% O$_2$, 5% CO$_2$, 5% H$_2$O, balance N$_2$ at GHSV=60 000 h$^{-1}$. A catalyzed filter article sample was first equilibrated with the main feed gas without NO and NH$_3$ at 200° C. for 30 min. NO and NH$_3$ were then sequentially added to the system at 200° C. with an equilibration time of 15 and 25 min, respectively. With the full reactive feed, the reactor inlet temperature was ramped from 200 to 500° C. at 2.5° C./min. All catalyst articles were tested as fresh (as prepared) and after aging (800° C. for 16 h with 10% H$_2$O in air). Results are provided in FIGS. 6-12 and are discussed below.

Figure 6:
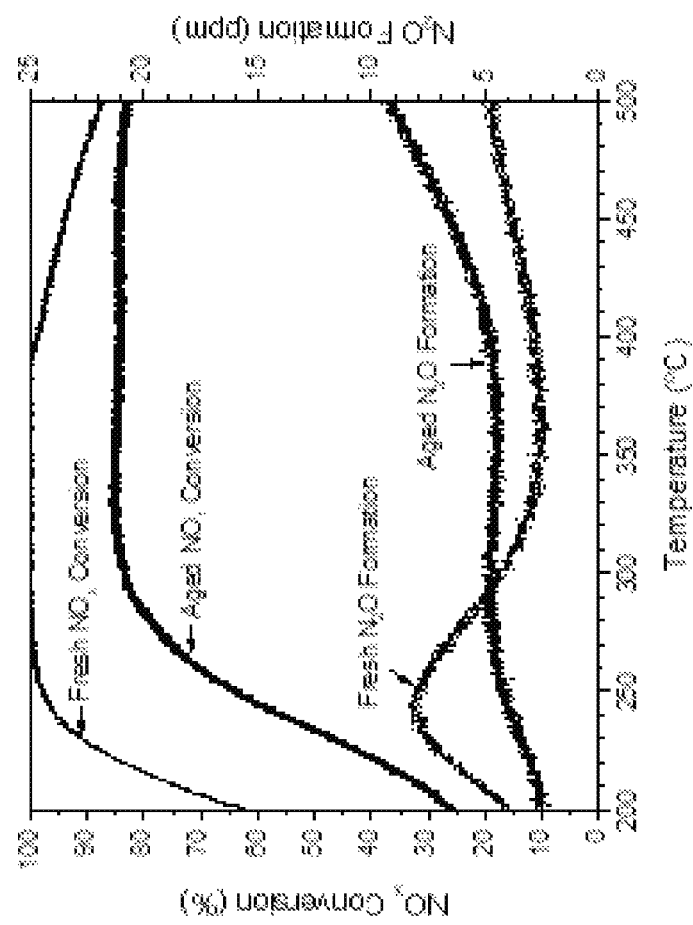
FIG. 6 is a graphical depiction of results of $NO_x$ conversion and $N_2O$ formation as a function of temperature for a fresh and aged SCR catalyst article according to certain embodiments.

FIG. 6 illustrates an exemplary test result obtained for catalyst article S1, graphically indicating NO$_x$ conversion and N$_2$O formation as a function of reaction temperature. For clarity, only NO$_x$ conversions at 200 and 500° C. as well as the peak N$_2$O formation are compared for articles S0 to S20 in FIGS. 7-12.

FIGS. 7a and 7b compare the NO$_x$ conversion at 200° C. of fresh catalyst articles (S1 to S10 and S11 to S20, respectively) to the zeolite-only comparative reference (S0). For the samples having Pt in the first coat (S1-S10), all samples showed higher NO$_x$ conversions than the reference (by 8 to 19%), with the exception of S9 and S10. For articles with Pt in the second coat (S11 to 20), two samples showed higher NO$_x$ conversion (S14 and S16), while others were comparable to or even lower (S19 and S20) than the reference (S0).

As shown in FIGS. 8a and 8b, the NO$_x$ conversions at 500° C. on these fresh catalyst articles (S1 to S10 and S11 to S20, respectively) was comparable to each other and to the reference S0 (87-90%).

Figure 9A:
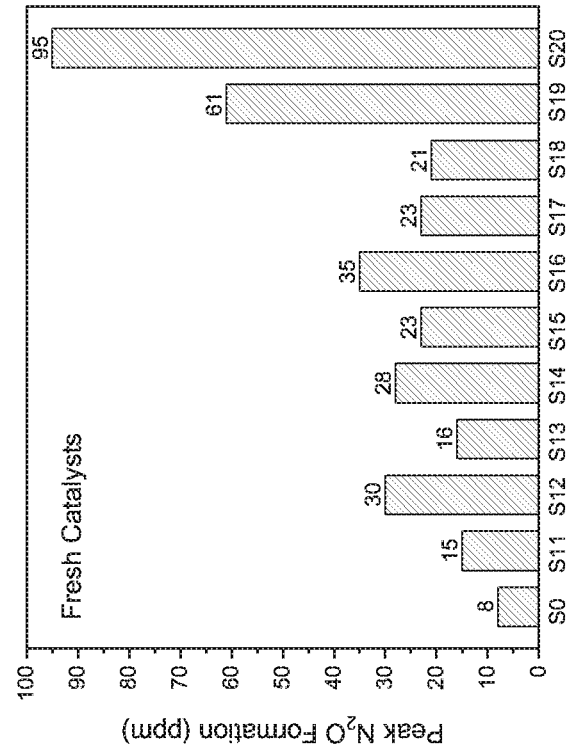
FIGS. 9a and 9b are graphical depictions of results of peak $N_2O$ formation at 200-300° C. for fresh SCR catalyst articles according to certain embodiments.
Figure 9B:
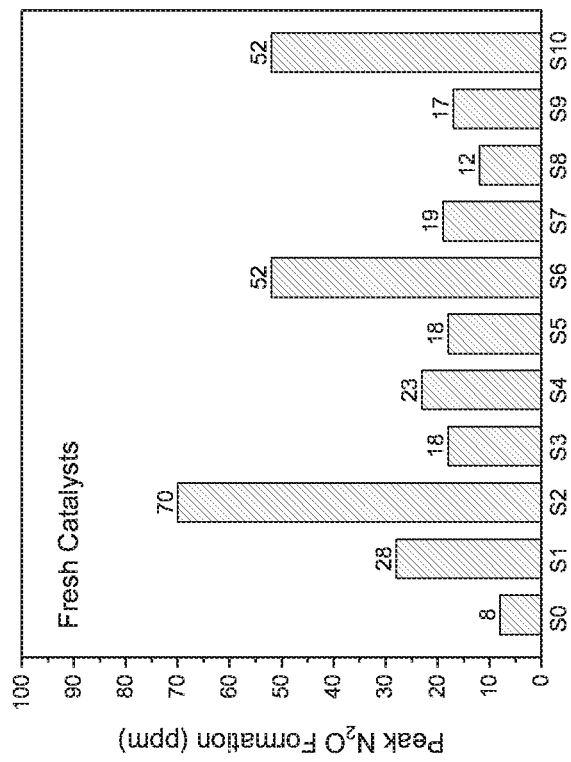

FIGS. 9a and 9b show the peak N$_2$O formation on the fresh catalyst articles (S1 to S10 and S11 to S20, respectively) in the low temperature region (200 to 300° C.). Much higher peak N$_2$O formation was observed for S20, S2, S19, S6 and S10 (95-52 ppm) relative to S0 (8 ppm). Other articles demonstrated slightly higher N$_2$O formation.

FIGS. 10a and 10b show the NO$_x$ conversion at 200° C. for S1 to S10 and S11 to S20, respectively, after hydrothermal aging at 800° C. for 16 h. Two articles (S7 and S9) demonstrated much higher NO$_x$ conversion (70% and 62%, respectively), than the reference S0 (25%). All other articles showed slightly higher NO$_x$ conversions (29 to 36%).

Figure 11A:
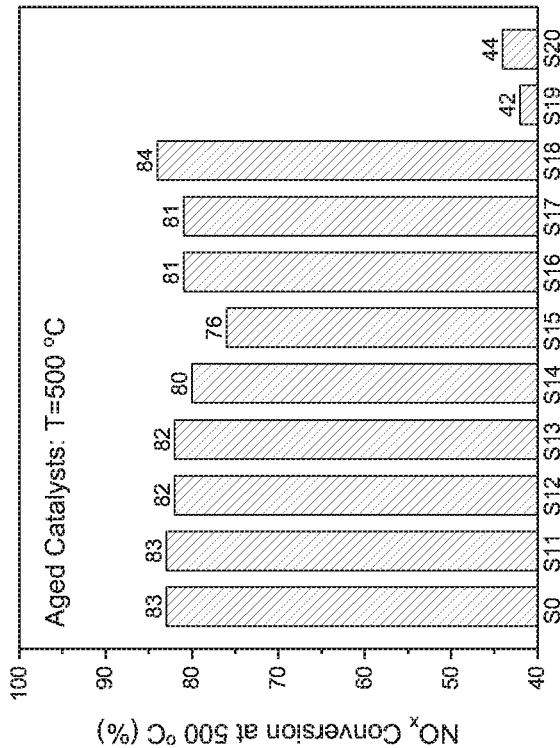
FIGS. 11a and 11b are graphical depictions of results of $NO_x$ conversion at 500° C. for aged SCR catalyst articles according to certain embodiments.
Figure 11B:
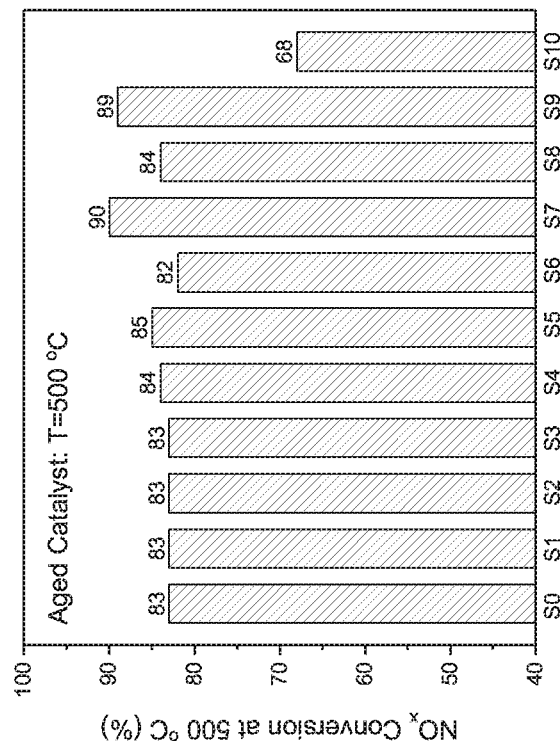

FIGS. 11a and 11b show the NO$_x$ conversions at 500° C. for the aged catalyst articles S1 to S10 and S11 to S20, respectively. Articles S7 and S9 demonstrated higher conversion than the reference S0 (90 and 89%, respectively, vs. 83% for the reference), whereas S10, S15, S19 and S20 were less active (68, 76, 42, and 44% conversion, respectively). Other articles displayed comparable NO$_x$ conversion to the reference S0.

Figure 12A:
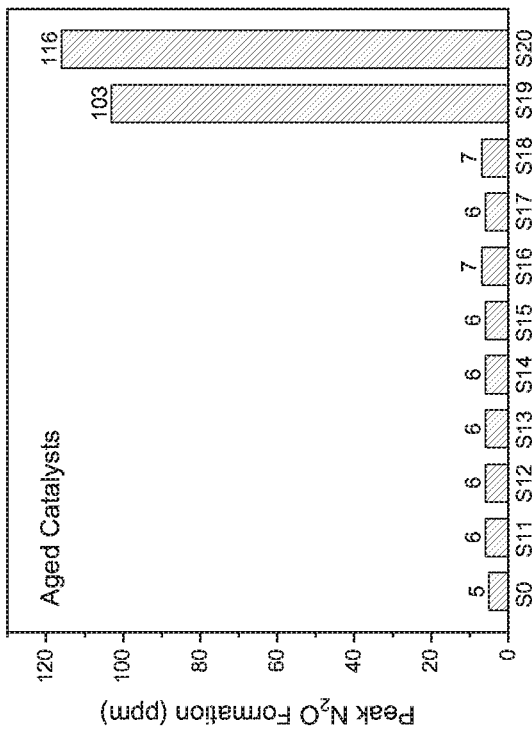
FIGS. 12a and 12b are graphical depictions of results of peak $N_2O$ formation at 200-300° C. for aged SCR catalyst articles according to certain embodiments.
Figure 12B:
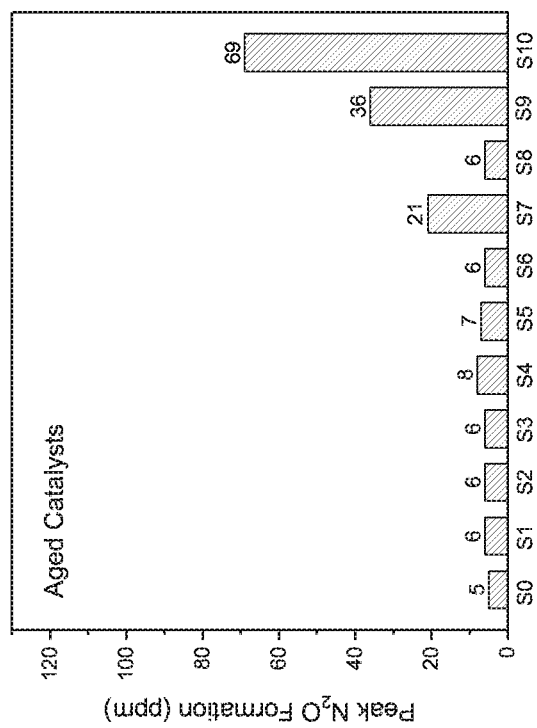

FIGS. 12a and 12b show the peak N$_2$O formation on the aged catalyst articles S1 to S10 and S11 to S20, respectively. Very high N$_2$O formation was observed for S10, S19 and S20 (69 to 116 ppm), slightly higher N$_2$O for S7 and S9 (21 and 36 ppm), and N$_2$O formation comparable to S0 on all other articles (5-7 ppm).

Overall, in view of all performance data, article S7 demonstrated the most favorable profile. Without wishing to be bound by theory, it is believed that ordinarily, Pt is too an strong oxidizing component, which would oxidize NH$_3$ to N$_2$O and NO$_x$ under SCR conditions, resulting in decreased NO$_x$ conversion and high N$_2$O formation. Without wishing to be bound by theory, it is believed that by impregnating and fixing Cu and Pt on the same support, the oxidizing function of Pt may be moderated while providing sufficient oxidation activity for in situ NO oxidation.

What is claimed is:

1. A selective catalytic reduction (SCR) article effective to catalyze the reduction of NOx from a lean burn engine exhaust gas in the presence of a reductant, the SCR article comprising a substrate having an inlet end and an outlet end defining an overall length, and a SCR catalyst composition disposed thereon,
    wherein the selective catalytic reduction (SCR) catalyst composition is effective to catalyze the reduction of nitrogen oxides (NOx) from a lean burn engine exhaust gas in the presence of a reductant and the catalyst composition comprises a first washcoat comprising:
    a first component comprising a porous refractory metal oxide support having deposited thereon a platinum group metal (PGM) and a base metal oxide, wherein the base metal oxide is copper oxide and a weight ratio of the porous refractory metal oxide-to-zeolite is from about 0.1 to about 10, and
    a second component comprising a zeolite promoted with a metal, wherein the metal is copper, and
    the catalyst composition comprises a second washcoat comprising the second component, wherein the second washcoat is disposed on at least a portion of the length of the catalyst substrate,
    wherein the SCR article has a zoned configuration, wherein the first washcoat is disposed on the catalyst substrate from the inlet end to a length of from about 10% to about 50% of the overall length; and wherein the second washcoat is disposed on the catalyst substrate from the outlet end to a length of from about 50% to about 90% of the overall length.

2. The SCR article of claim 1, wherein the first washcoat is disposed directly on the catalyst substrate, and the second washcoat is disposed on at least a portion of the first washcoat.

3. The SCR article of claim 1, wherein the second washcoat is disposed directly on the catalyst substrate, and the first washcoat is disposed on at least a portion of the second washcoat.

4. The SCR article of claim 1, wherein the first washcoat is disposed directly on the catalyst substrate from the inlet end to a length of from about 10% to about 50% of the overall length; and the second washcoat is disposed on at least a portion of the first washcoat.

5. The SCR article of claim 1, wherein the second washcoat is disposed directly on the catalyst substrate from the inlet end to a length of from about 50% to about 100% of the overall length; and the first washcoat is disposed on at least a portion of the second washcoat.

6. The SCR article of claim 1, wherein the first washcoat is disposed directly on the catalyst substrate from the inlet end to a length of from 20% to about 40% of the overall length, and the second washcoat extends from the inlet end to the outlet end.

7. The SCR article of claim 6, wherein the PGM is Pt, the base metal oxide is copper oxide, the zeolite has the chabazite structure and is promoted with copper, the porous refractory metal oxide is alumina containing 5% silica, the Pt is present in an amount of about 2.9% by weight of the porous refractory metal oxide, and the copper oxide is present in an amount of about 10% by weight of the porous refractory metal oxide.

8. The SCR article of claim 1, wherein the first washcoat is disposed directly on the catalyst substrate from the outlet end to a length of from about 10% to about 50% of the overall length, and the second washcoat is disposed on at least a portion of the first washcoat.

9. The SCR article of claim 1, wherein the first washcoat is disposed directly on the catalyst substrate from the outlet end to a length of from about 20 to about 40% of the overall length, and the second washcoat extends from the inlet end to the outlet end.

10. The SCR article of claim 1, wherein the second washcoat is disposed directly on the catalyst substrate from the outlet end to a length of from about 50% to about 100% of the overall length, and the first washcoat is disposed on at least a portion of the second washcoat.

11. The SCR article of claim 1, wherein the first washcoat is disposed directly on the catalyst substrate covering 100% of the overall length, and the second washcoat is disposed on the first washcoat covering 100% of the overall length.

12. The SCR article of claim 1, where the second washcoat is disposed directly on the catalyst substrate covering 100% of the overall length, and the first washcoat is disposed on the second washcoat covering 100% of the overall length.

13. The SCR article of claim 1, having a zoned configuration, wherein the first washcoat is disposed on the catalyst substrate from the outlet end to a length of from about 10% to about 50% of the overall length; and wherein the second washcoat is disposed on the catalyst substrate from the inlet end to a length of from about 50% to about 90% of the overall length.

14. The SCR article of claim 1, wherein the substrate is a honeycomb substrate.

15. The SCR article of claim 14, wherein the honeycomb substrate is a flow-through substrate or a wall-flow filter.

16. The SCR article of claim 1, wherein the effective reduction of NOx is at a temperature that is above about 150° C. and below about 700° C.

17. The SCR article of claim 1, wherein the porous refractory metal oxide comprises silica, alumina, ceria, zirconia, ceria-zirconia composite, titania, or combinations thereof.

18. The SCR article of claim 1, wherein the zeolite has a structure type selected from the group consisting of AEI, AFT, AFV, AFX, AVL, CHA, DDR, EAB, EEI, ERI, IFY, IRN, KFI, LEV, LTA, LTN, MER, MWF, NPT, PAU, RHO, RTE, RTH, SAS, SAT, SAV, SFW, TSC, UFI, and combinations thereof.

19. The SCR article of claim 1, wherein the base metal oxide is present in an amount of from about 0.1 to about 20% by weight of the porous refractory metal oxide support.

20. The SCR article of claim 1, wherein the PGM is present in an amount of about 0.01 to about 20% by weight of the porous refractory metal oxide support.

21. An exhaust gas treatment system comprising a lean burn engine that produces an exhaust gas stream and the SCR article of claim 1.

22. The exhaust gas treatment system of claim 21, further comprising one or more of a diesel oxidation catalyst (DOC), a soot filter, a urea injection component, an ammonia oxidation catalyst (AMOX), a low-temperature NOx absorber (LT-NA) catalyst, and a lean NOx trap (LNT).

* * * * *